(12) United States Patent
Collins et al.

(10) Patent No.: US 9,953,085 B1
(45) Date of Patent: Apr. 24, 2018

(54) FEED UPLOAD FOR SEARCH ENTITY BASED CONTENT SELECTION

(71) Applicant: Google Inc.

(72) Inventors: Alexander Collins, San Francisco, CA (US); Ian James Leader, Zurich (CH); Yunkai Zhou, Sewickley, PA (US)

(73) Assignee: Google LLC, Mountain View, CA (US)

( * ) Notice: Subject to any disclaimer, the term of this patent is extended or adjusted under 35 U.S.C. 154(b) by 182 days.

(21) Appl. No.: 13/932,836

(22) Filed: Jul. 1, 2013

Related U.S. Application Data

(60) Provisional application No. 61/829,634, filed on May 31, 2013.

(51) Int. Cl.
*G06F 17/30* (2006.01)

(52) U.S. Cl.
CPC ............... *G06F 17/30867* (2013.01)

(58) Field of Classification Search
None
See application file for complete search history.

(56) References Cited

U.S. PATENT DOCUMENTS

| | | | |
|---|---|---|---|
| 5,418,713 A | 5/1995 | Allen | |
| 5,498,002 A | 3/1996 | Gechter | |
| 5,572,643 A | 11/1996 | Judson | |
| 5,602,565 A | 2/1997 | Takeuchi | |
| 5,634,850 A | 6/1997 | Kitahara et al. | |
| 5,682,511 A | 10/1997 | Sposato et al. | |
| 5,748,173 A | 5/1998 | Gur | |
| 5,774,664 A | 6/1998 | Hidary et al. | |
| 5,778,181 A | 7/1998 | Hidary et al. | |
| 5,831,591 A | 11/1998 | Suh | |
| 5,845,263 A | 12/1998 | Camaisa et al. | |
| 5,856,821 A | 1/1999 | Funahashi | |
| 6,011,537 A | 1/2000 | Slotznick | |
| 6,018,768 A | 1/2000 | Ullman et al. | |
| 6,026,373 A | 2/2000 | Goodwin, III | |
| 6,185,558 B1 | 2/2001 | Bowman et al. | |
| 6,199,060 B1 | 3/2001 | Gustman | |
| 6,275,806 B1 | 8/2001 | Pertrushin | |
| 6,320,602 B1 | 11/2001 | Burkardt et al. | |

(Continued)

FOREIGN PATENT DOCUMENTS

| EP | 0 408 348 A2 | 1/1991 |
|---|---|---|
| KR | 10-2000-0017807 A | 4/2000 |

(Continued)

OTHER PUBLICATIONS

Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.

(Continued)

*Primary Examiner* — Sangwoo Ahn
(74) *Attorney, Agent, or Firm* — Foley & Lardner LLP

(57) ABSTRACT

Systems and methods for a feed upload for search entity based content selection include receiving a feed. The feed has feed items that include identification data, a feed item type, and an online action. The identification data and item type are used to identify a unique search entity that corresponds to a named entity in the physical world. An entity-action pair is generated based on the identified search entity.

15 Claims, 6 Drawing Sheets

(56) References Cited

U.S. PATENT DOCUMENTS

| | | |
|---|---|---|
| 6,505,169 B1 | 1/2003 | Bhagavath et al. |
| 6,510,553 B1 | 1/2003 | Hazra |
| 6,570,587 B1 | 5/2003 | Efrat et al. |
| 6,591,247 B2 | 7/2003 | Stern |
| 6,642,940 B1 | 11/2003 | Dakss et al. |
| 6,684,249 B1 | 1/2004 | Frerichs et al. |
| 6,823,495 B1 | 11/2004 | Vedula et al. |
| 6,857,007 B1 | 2/2005 | Bloomfield |
| 7,124,101 B1 | 10/2006 | Mikurak |
| 7,158,676 B1 | 1/2007 | Rainsford |
| 7,526,786 B1 | 4/2009 | Adams et al. |
| 7,647,242 B2 | 1/2010 | Bem |
| 7,668,821 B1 | 2/2010 | Donsbach et al. |
| 7,831,472 B2 | 11/2010 | Yufik |
| 7,853,255 B2 | 12/2010 | Karaoguz et al. |
| 7,979,459 B2 | 7/2011 | Wu et al. |
| 8,065,611 B1 | 11/2011 | Chan et al. |
| 8,073,868 B2* | 12/2011 | Lavi ................. G06F 17/30867 707/706 |
| 8,108,253 B2 | 1/2012 | Poon et al. |
| 8,126,766 B2 | 2/2012 | Alexander |
| 8,135,619 B2 | 3/2012 | Bem |
| 8,195,133 B2 | 6/2012 | Ramer et al. |
| 8,301,499 B2 | 10/2012 | Moissinac et al. |
| 8,386,386 B1 | 2/2013 | Zhu |
| 8,463,783 B1 | 6/2013 | Yagnik |
| 8,903,716 B2 | 12/2014 | Chen et al. |
| 2002/0032603 A1 | 3/2002 | Yeiser |
| 2002/0053078 A1 | 5/2002 | Holtz et al. |
| 2002/0065722 A1 | 5/2002 | Hubbard et al. |
| 2003/0018541 A1 | 1/2003 | Nohr |
| 2003/0028873 A1 | 2/2003 | Lemmons |
| 2003/0033161 A1 | 2/2003 | Walker et al. |
| 2003/0040957 A1 | 2/2003 | Rodriguez et al. |
| 2003/0074662 A1 | 4/2003 | Istvan et al. |
| 2004/0044569 A1 | 3/2004 | Roberts et al. |
| 2004/0260621 A1 | 12/2004 | Foster et al. |
| 2005/0187823 A1 | 8/2005 | Howes |
| 2005/0188400 A1 | 8/2005 | Topel |
| 2005/0220439 A1 | 10/2005 | Carton et al. |
| 2005/0261968 A1 | 11/2005 | Randall et al. |
| 2005/0288096 A1 | 12/2005 | Walker et al. |
| 2006/0064411 A1 | 3/2006 | Gross et al. |
| 2006/0293995 A1 | 12/2006 | Borgs et al. |
| 2007/0094042 A1* | 4/2007 | Ramer et al. ............... 705/1 |
| 2007/0094081 A1 | 4/2007 | Yruski et al. |
| 2007/0097975 A1 | 5/2007 | Rakers et al. |
| 2007/0123222 A1 | 5/2007 | Cox et al. |
| 2007/0127688 A1 | 6/2007 | Doulton |
| 2007/0174258 A1 | 7/2007 | Jones et al. |
| 2007/0288309 A1 | 12/2007 | Haberman et al. |
| 2008/0060001 A1 | 3/2008 | Logan et al. |
| 2008/0066107 A1 | 3/2008 | Moonka et al. |
| 2008/0086368 A1 | 4/2008 | Bauman et al. |
| 2008/0091537 A1 | 4/2008 | Miller et al. |
| 2008/0107404 A1 | 5/2008 | Nakamura et al. |
| 2008/0109306 A1 | 5/2008 | Maigret et al. |
| 2008/0172422 A1 | 7/2008 | Li et al. |
| 2008/0187279 A1 | 8/2008 | Gilley et al. |
| 2008/0235087 A1 | 9/2008 | Amento et al. |
| 2008/0243821 A1 | 10/2008 | Delli Santi et al. |
| 2008/0263583 A1 | 10/2008 | Heath |
| 2008/0270538 A1 | 10/2008 | Garg et al. |
| 2009/0163227 A1 | 6/2009 | Collins |
| 2009/0179900 A1 | 7/2009 | Petrovic et al. |
| 2009/0254971 A1 | 10/2009 | Herz et al. |
| 2009/0265236 A1 | 10/2009 | Schultz et al. |
| 2009/0307013 A1 | 12/2009 | Altounian et al. |
| 2010/0104145 A1 | 4/2010 | Momosaki |
| 2010/0287056 A1 | 11/2010 | Koningstein et al. |
| 2011/0161130 A1 | 6/2011 | Whalin et al. |
| 2011/0208822 A1* | 8/2011 | Rathod ........................ 709/206 |
| 2011/0238500 A1 | 9/2011 | Kim |
| 2011/0246285 A1 | 10/2011 | Ratnaparkhi et al. |
| 2011/0295847 A1* | 12/2011 | Cucerzan .......... G06F 17/30864 707/723 |
| 2012/0054015 A1 | 3/2012 | Wu |
| 2012/0059713 A1 | 3/2012 | Galas et al. |
| 2012/0072280 A1 | 3/2012 | Lin |
| 2012/0095828 A1 | 4/2012 | Evankovich et al. |
| 2012/0150657 A1* | 6/2012 | Rubinstein ............. G06Q 30/02 705/14.66 |
| 2012/0265528 A1 | 10/2012 | Gruber et al. |
| 2013/0117022 A1 | 5/2013 | Chen et al. |
| 2013/0268507 A1* | 10/2013 | Macbeth ............ G06Q 30/0627 707/709 |
| 2013/0272570 A1 | 10/2013 | Sheng et al. |
| 2013/0275164 A1 | 10/2013 | Gruber et al. |
| 2013/0304758 A1 | 11/2013 | Gruber et al. |
| 2013/0318089 A1* | 11/2013 | Tan ..................... G06Q 30/0603 707/740 |
| 2014/0280015 A1* | 9/2014 | Marantz et al. ............. 707/710 |
| 2014/0324851 A1* | 10/2014 | Tholiya ............. G06F 17/30864 707/731 |
| 2014/0351241 A1* | 11/2014 | Leask et al. .................. 707/722 |
| 2014/0351261 A1* | 11/2014 | Aswani ............. G06F 17/30958 707/741 |
| 2016/0063106 A1* | 3/2016 | Chai ................. G06F 17/30958 707/722 |
| 2017/0092278 A1 | 3/2017 | Evermann et al. |
| 2017/0110130 A1 | 4/2017 | Sharifi et al. |
| 2017/0132019 A1 | 5/2017 | Karashchuk et al. |

FOREIGN PATENT DOCUMENTS

| | | |
|---|---|---|
| WO | WO-02/37470 | 5/2002 |
| WO | WO-02/080555 A2 | 10/2002 |

OTHER PUBLICATIONS

Lund, Pamela, Mastering Google Product Feeds and Product Listing Ads—Part 1, found at http://www.blueglass.com/blog/mastering-google-product-feeds-and-product-listing-ads-part-1/#comments on Mar. 18, 2013, 17 pages.

Google Inc., Products Feed Specification, printed from Internet address: http://www.support.google.com/merchants/bin/answer.py?hl=en&answer=188494#US, on Mar. 18, 2013, 6 pages.

Google Inc., Supported File Formats, printed from Internet address: http://www.support.google.com/merchants/bin/answer.py?hl=en&answer=160567, on Mar. 18, 2013, 1 page.

"Amazon and Google Want to Turn Their Smart Home Speakers Into Telephone Replacements—Mac Rumors" MacRumors, 9 pages.

"Apple Patent Reveals a New Security Feature Coming to Siri" 6 pages.

"Introducing Echo Look Hands-Free Camera and Style Assistant" 1996-2017, Amazon.com, Inc. 5 pages.

"The Patent Behind Google Home's New Feature of Understanding Different Voices in the Home Surfaced Today", Apr. 20, 2017, 5 pages.

Close, "Amazon Echo Will Give You These Deals If You Order Through Alexa This Weekend," Web Article, Nov. 18, 2016, Time.com (2 pages).

Collins, Terry "Can Twitter Save itself? The Social Network is Slowly gaining users, but still Lags Far Behind Rivals. Is a Turnaround Possible?" 3 pages.

Cook, "A Siri for advertising: These mobile ads talk back to you," Web Article, Apr. 1, 2013, Geekwire.com (7 pages).

Golgowski, Nina, "This Burger King Ad Is Trying to Control Your Google Home Device", Apr. 12, 2017, 7 pages.

Larson, Selena "Google Home Now Recognizes your Individual Voice" dated Apr. 20, 2017, 3 pages.

Nieva, Richard, "Google Home and eBay can tell you how much that's worth", 3 pages.

Purcher, Jack, Today Google Home's Virtual Assistant can learn its Owner's voice for Security Reasons like Apple's Patent Pending Idea, Apr. 20, 2017, 4 pages.

(56) References Cited

OTHER PUBLICATIONS

Seifert, Dan "Samsung's New Virtual Assistant Will Make Using Your Phone Easier", Mar. 20, 2017, 7 pages.
Sherr, Ian "IBM Built a Voice Assistant for Cybersecurity" dated Feb. 13, 2017, 4 pages.
Siegal, Daniel, "IP Attys Load Up Apps' Legal Challenges at Silicon Beach" 6 pages.
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
U.S. Final Office Action for U.S. Appl. No. 13/295,507 dated Oct. 30, 2013.
U.S. Non Final Office Action for 13/295,507 dated May 10, 2013.
U.S. Office Action on U.S. Appl. No. 13/295,507 dated Jul. 23, 2015.
U.S. Office Action on U.S. Appl. No. 13/168,904 dated Aug. 7, 2013.
U.S. Office Action on U.S. Appl. No. 13/295,507 dated Mar. 24, 2016.
U.S. Office Action on U.S. Appl. No. 14/190,523 dated Feb. 22, 2017.
U.S. Office Action on U.S. Appl. No. 14/190,523 dated Aug. 21, 2014.
U.S. Office Action on U.S. Appl. No. 14/190,523 dated Dec. 3, 2014.
U.S. Office Action on U.S. Appl. No. 14/190,523 dated Apr. 2, 2015.
The International Search Report and the Written Opinion of the International Searching Authority for application No. PCT/US2017/049713 dated Oct. 25, 2017.
"CrunchBase ScanScout," [online] [Retrieved on Mar. 11, 2011]; Retrieved from the Internet URL: http://www.crunchbase.com/company/ScanScout; 3 pages.
"Introducing Adap.tv for Advertisers," [online][Retrieved on Mar. 11, 2011]; Retrieved from the internet URL: http://www.adap.tv/demo.html; 1 page.
"MeToday Jul. 4, 2007," [online] [Retrieved on Mar. 11, 2011]; Retrieved from the Internet, URL: http://www.viddler.com/explore/djsteen/videos/27/; 1 page.
"Ooyala Blog: Create the Group," [online][Retrieved on Mar. 11, 2011]; Retrieved from the Internet URL: http//www.ooyala.com/blog; 11 pages.
"Walmart and Google to offer voice-enabled shopping", BBC News, Aug. 23, 2017.
"What's Hot on Shopping.com," [online][Retrieved on Mar. 11, 2011]; Retrieved from the Internet URL; shopping.com; 2 pages.
Anonymous, "Microsoft for Digital Advertising Industry", PR Newswire, New York, Jan. 13, 2006, pp. 1-4. ProQuest Document ID 968489271.
Arrington, Michael, "Hulu Makes First Acquisition; Chinese Video Startup to Form Backbone of New Service," [online] [Retrieved on Mar. 11, 2011]; Retrieved from the Internet URL: http://www.techcrunch.com/2007/09/12/hulu-makes-first-acquisition-chinese-video-startup-to-form-backbone-of-new-service/; 6 pages.
Arrington, Michael, "TechCrunch—AdBrite Makes Brilliant Video Product," [online][Retrieved on Mar. 11, 2011]; Retrieved from the Internet URL: http://www.techcrunch.com/2007/1/4/adbrite-makes-brilliant-video-product; 12 pages.
Arrington, Michael, "TechCrunch—Cisco and Click.tv?," [online][Retrieved on Mar. 11, 2011]; Retrieved from the Internet URL: http;//www.techcrunch.com/2007/07/30/cisco-and-clicktv/; 4 pages.
Arrington, Michael, "TechCrunch—Click.tv Moves Video Ideas Forward," [online][Retrieved on Mar. 11, 2011] Retrieved from the Internet URL: http://www.techcrunch.com/2006/04/16/clicktv-moves-video-ideas-forward/; 6 pages.
Arrington, Michael, "TechCrunch—FuckedCompany's Adbrite Spawn Goes 2.0," [online][Retrieved on Mar. 11, 2011]; Retrieved from the Internet URL: http://www.techcrunch.com/2007/01/04/adbrite-makes-brilliant-video-product; 5 pages.
Asterpix Interactive Video, 'Introducing Hypervideo', [online] [retrieved on Nov. 26, 2007]. Retrieved from http://www.asterpix.com/help/learnmore/introducing/.
Broussard, Mitchel, "Chatbot-Like Siri Patent Includes Intelligent Image, Video, and Audio Recognition Within Messages", May 11, 2017, 11 pages.
Chen, Yilun Lulu, "Alibaba Challenges Google, Amazon With New Echo-Like Device", Bloomberg, Jul. 5, 2017, 3 pages.
Crist, Ry, "Logitech Harmony's Alexa Skill just got a whole lot better", cnet, Jul. 13, 2017 (2 pages).
CrunchBase Company Profile, 'ScanScout', Jul. 24, 2007 [online][retrieved on Nov. 26, 2007]. Retrieved from http://www.crunchbase.com/company/ScanScout.
Dominguez, C., 'BroadRamp technology will make TV shows virtual mall', San Antonio Business Journal, Jun. 11, 2007, [online] [retrieved on Nov. 26, 2007]. Retrieved from http://cincinnati.bizjournals.com/sanantonio/stories/2007/06/11story2.html?t=printable.
Dominguez, Catherine, "BroadRamp technology will make TV shows virtual mall", San Antonio Business Journal, The Essential Business Tool, Jun. 11, 2007, pp. 1-3, http://sanantonio.bizjournals.com/sanantonio/stories/2007/06/11/story3.html.
Dominguez, Catherine, "BroadRamp technology will make TV shows virtual mall." [online][Retrieved on Mar. 16, 2011]; Retrieved from the Internet URL: http//www.bizjournals.com/sanantonio/stories/2007/06/11/sotry3.html; 3 pages.
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Gonzalez, Nick, "TechCrunch—Video Ads: Every Startup Has a Different Solution," [online][Retrieved on Mar. 11, 2011]; Retrieved from the Internet URL: http://www.techcrunch.com/2007/07/06/video-ads-somebody-needs-to-solve-this-problem/; 8 pages.
Gonzalez, Nick, "TechCrunch—YuMe Closes $9 Million Series B," [online] [Retrieved on Mar. 16, 2011]: Retrieved from the Internet URL: http://techcrunch.com/2007/10/16/yume-closes-9-million-series-b/; 1 page.
Google Developers Newsletter "Google Assistant SDK", developers.google.com, retrieved on Jul. 12, 2017, 2 pages.
Gurma, Mark and Webb, Alex, "Apple Is Manufacturing a Siri Speaker to Outdo Google and Amazon", Bloomberg, May 31, 2017, 3 pages.
Hardwick, Tim, "Facebook Smart Speaker Coming Next Year With 15-inch Touch Panel", MacRumors, Jul. 25, 2017 (5 pages).
Hendrickson, Mark, "TechCrunch—Time Warner Invests in Video Ads Startup ScanScout,", [online] [Retrieved on Mar. 11, 2011]; Retrieved from the Internet URL: http://www.techcrunch.com/2007/09/09/time-warner-backs-video-ads-through=scanscout/; 6 pages.
International Preliminary Report on Patentablity for PCT/US2008/084982 dated Jun. 10, 2010, 5 pages.
International Search Report and Written Opinion on PCT Application PCT/US2008/84982, dated Jun. 23, 2009, 8 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017, 3 pages.
Lee, Dave, "The five big announcements from Google I/O", BBC, May 18, 2017, 11 pages.
Notice of Allowance for U.S. Appl. No. 13/490,912, dated Jan. 7, 2014,17 pages.

(56) References Cited

OTHER PUBLICATIONS

Ooyala, 'Overview', [online] [retrieved on Nov. 26, 2007]. Retrieved from http://www.ooyala.com/about.

Perez, Sarah, "The first ad network for Alexa Skills shuts down following Amazon's policy changes", Tech Crunch, Jun. 15, 2017, 8 pages.

Porter, Jon, "Amazon Echo Show release date, price, news and features", Tech Radar, Jun. 26, 2017, 11 pages.

Riley, Duncan, "TechCrunch—Contextual In-Video Advertising: ScanScout," [online] [Retrieved on Mar. 11, 2011]; Retrieved from the Internet URL: http://www.techcrunch.com/2007/0514/contextual-in-video=-advertising-scanscout/; 5 pages.

Sablich, Justin, "Planning a Trip With the Help of Google Home", New York Times, dated May 31, 2017, 6 pages.

Smith, Dave, "The Amazon Echo got 2 incredibly useful features thanks to a new update", Business Insider, Jun. 1, 2017, 2 pages.

Techcrunch, 'Cisco and Click.tv?', Jul. 30, 2007, [online] [retrieved on Nov. 26, 2007]. Retrieved from http://www.techcrunch.com/2007/07/30/cisco-and-clicktv/.

Techcrunch, 'Hulu Makes First Acquisition; Chinese Video Startup to Form Backbone of New Service', Sep. 12, 2007, [online] [retrieved on Nov. 26, 2007]. Retrieved from http://www.techcrunch.com/2007/09/12/hulu-makes-first-acquisition-chinese-video-startup.

Techcrunch, 'Video Ads: Every Startup has a Different Solution', Jul. 6, 2007 [online][retrieved on Nov. 26, 2007]. Retrieved from http://www.techcrunch.com2007/07/06/video-ads-somebody-needs-to-solve-this-problem.

U.S. Notice of Allowance for U.S. Appl. No. 11/948,643, dated Feb. 27, 2012 (12 pages).

U.S. Notice of Allowance on U.S. Appl. No. 13/168,904, dated Jan. 10, 2014 (8 pages).

U.S. Office Action dated Dec. 9, 2010, for U.S. Appl. No. 11/948,643 (20 pages).

U.S. Office Action for U.S. Appl. No. 13/490,912, dated Apr. 16, 2013, 31 pages.

U.S. Office Action for U.S. Appl. No. 13/490,912, dated Aug. 2, 2012, 25 pages.

U.S. Office Action on U.S. Appl. No. 14/190,523 dated May 26, 2015.

U.S. Office Action on U.S. Appl. No. 15/584,940 dated Aug. 14, 2017 (15 pages).

Willens, Max, "For publishers, Amazon Alexa holds promise but not much money (yet)", Digiday, Jul. 6, 2017, 5 pages.

YuMe Networks, 'About Us', [online] [retrieved on Nov. 26, 2007]. Retrieved from http://yumenetworks.com/about.html.

\* cited by examiner

US 9,953,085 B1

FEED UPLOAD FOR SEARCH ENTITY BASED CONTENT SELECTION

The present application claims priority to U.S. Provisional App. No. 61/829,634 filed May 31, 2013 and entitled "FEED UPLOAD FOR SEARCH ENTITY BASED CONTENT SELECTION."

BACKGROUND

Online content may be available regarding any number of disparate topics. For example, a first website on the Internet may be devoted to the migratory habits of bats and a second website may be devoted to automotive repair. In many cases, a user must proactively seek out online content of interest to the user. For example, an Internet user may utilize a search engine to search for webpages devoted to automotive repair. The user may then navigate between the webpages in the search results until the user finds the webpage that most closely matches the user's interests.

SUMMARY

Implementations of the systems and methods for a feed upload for search entity based content selection are described herein. One implementation is a method of matching an item in a feed to a search entity. The method includes receiving, at one or more processors, a feed having one or more feed items, each feed item including identification data, a feed item type, and an online action. The method also includes identifying a unique search entity using the identification data and item type for a feed item, the search entity corresponding to a named entity in the physical world. The method further includes generating an entity-action pair that includes the identified search entity and the online action of the feed item.

Another implementation is a system for matching an item in a feed to a search entity. The system includes one or more processors and a memory configured to receive a feed. The feed includes one or more feed items, each feed item having identification data, a feed item type, and an online action. The one or more processors and the memory are also configured to identify a unique search entity using the identification data and item type for a feed item, the search entity corresponding to a named entity in the physical world. The one or more processors and the memory are further configured to generate an entity-action pair that includes the identified search entity and the online action of the feed item.

A further implementation is a computer-readable storage medium having machine instructions stored therein, the instructions being executable by one or more processors to cause the one or more processors to perform operations. The operations include receiving a feed. The feed includes one or more feed items, each feed item having identification data, a feed item type, and an online action. The operations also include identifying a unique search entity using the identification data and item type for a feed item, the search entity corresponding to a named entity in the physical world. The operations further include generating an entity-action pair including the identified search entity and the online action of the feed item.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below.

Other features, aspects, and advantages of the disclosure will become apparent from the description, the drawings, and the claims, in which:

Like reference numbers and designations in the various drawings indicate like elements.

DETAILED DESCRIPTION

Figure 1:
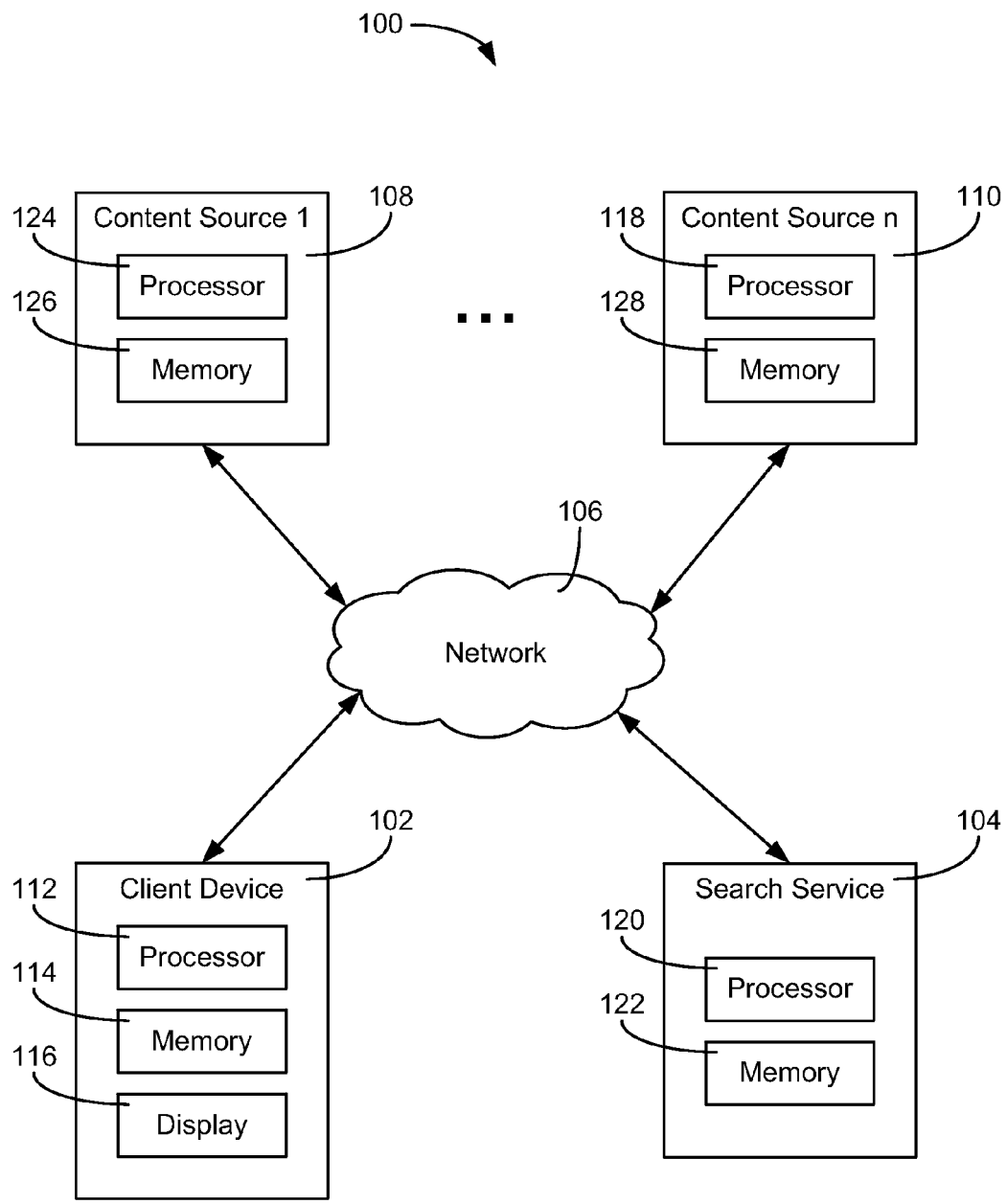
FIG. 1 is a block diagram of a computer system in accordance with described implementations.

According to some aspects of the present disclosure, a client device may receive first-party and third-party content for presentation to a user. As used herein, first-party content refers to the primary online content requested by a client device, such as a search result screen provided by a search service to the client device. For example, first-party content may be a search result webpage requested by the device or may be a screen presented as part of a stand-alone application (e.g., a navigation program, a search program, etc.). Third-party content, in contrast, refers to additional content that may be provided in conjunction with the first-party content. For example, third-party content may be a public service announcement or an advertisement that appears in conjunction with a requested webpage (e.g., a search result webpage from a search engine, a webpage that includes an online article, a webpage of a social networking service, etc.) or within a stand-alone application (e.g., an advertisement within a game, a messaging program, a navigation program, etc.). Generally, a first-party content provider refers to any content provider that allows another content provider (i.e., a third-party content provider) to provide content in conjunction with that of the first-party provider. The first-party content provider may or may not be compensated for allowing a third-party provider to provide content with the first-party provider's content. For example, the first-party provider may receive compensation for allowing certain paid public service announcements or advertisements to be provided in conjunction with the first-party provider's content.

A first-party search service may be configured to use search entities to represent concepts that underlie search queries. Search entities may generally correspond to named entities in the physical world. For example, a search entity may correspond to a specific location, person, group of people, media content (e.g., movies, songs, etc.), or the like. In such a case, a pool of facts or other information regarding the search entity may be made available as part of search results, in addition to, or in lieu of, links to webpages regarding the entity. For example, a search query may correspond to a search entity for the Taj Mahal. Associated with the Taj Mahal search entity may be various facts about the mausoleum, such as its location, height, when it was constructed, or other such information. In some implementations, a search entity may be presented in conjunction with search results as part of a search result screen. For example, a search result webpage may include hyperlinks to webpages that match a search query as well as a search entity that corresponds to the search query (e.g., a search for the Taj Mahal may result in links to Taj Mahal-related webpages as well as the Taj Mahal search entity being displayed). In some embodiments, a search entity may be related to one or more other search entities. For example, a search entity for a particular musician may be related to search entities for his or her particular songs, albums, etc.

A first-party search service may also have one or more online actions associated with a given search entity. Such associations may be represented as entity-action pairs. In addition to general information about a particular search entity (e.g., what a user may wish to know about the search entity), the search entity may also be associated with various online actions (e.g., what the user may wish to do regarding the search entity). For example, assume that a search entity relates to a particular movie. In such a case, online actions that may be associated with the search entity may include purchasing a hardcopy of the particular movie (e.g., DVD, Blu-Ray, etc.) or watching the movie via streaming. Examples of online actions may include, but are not limited to, streaming a piece of media content, making an online purchase, making reservations, purchasing tickets, or any other form of online action.

In some cases, a first-party search service may be configured to select third-party content for presentation with search results based on an entity-action pair. For example, assume that an advertiser is selling DVD copies of a particular movie. In such a case, the advertiser may specify that they wish to place an advertisement whenever the entity-action pair including the movie entity and "purchase" online action is triggered by a search query. The search service may also conduct a content auction in which different third-party content providers compete for the ability to include third-party content with the search results. For example, the system may provide a link to the website of the advertiser with the search results, allowing the user to quickly purchase the DVD.

Other types of third-party content may be selected by the system, such as product advertisements or sponsored hyperlink search results, in addition to or in lieu of content selected based on an entity-action pair. These types of third-party content may be associated with particular keywords specified by their content providers. For example, assume that a user performs a generic search for "new DVD releases." In response, the system may conduct a content auction among those content providers that specified the keywords "new DVD releases." In conjunction with the search results, the system may then include a link to the website of a content provider that sells DVDs. Since the search query does not pertain to any particular search entity, no search entity or third-party content associated with an entity-action pair may be provided with the search results. In other words, content auctions based on search terms are always likely to be conducted, but content auctions for entity-action pairs may only be conducted if the search query pertains to a particular search entity.

In contrast to third-party content selected based solely on search queries (e.g., product advertisements, sponsored hyperlink search results, etc.), content selected based on entity-action pairs allows different types of content providers to compete against other content providers that offer comparable products or services. For example, assume that a third-party content provider operates a streaming service and has the movie "Sheriff Bob" available for rental at $1.99 and that another third-party content provider has DVD copies of the movie available for purchase at $24.99. Both content providers may opt to compete in content auctions whenever a search is performed for the keywords "Sheriff Bob" (e.g., content is selected based solely on the search keywords). In such a case, however, the DVD retailer may always be willing to bid a higher amount than the streaming provider, since the products and services differ. For example, the DVD retailer may be willing to pay $2 whenever a user clicks on a link to the provider's website and purchases a DVD. Since this amount is greater than the full cost to rent the movie from the streaming provider, the streaming provider is unlikely to be willing to place a competitive bid for the search terms. Placing a bid for a specific entity-action pair, however, allows the streaming provider to compete against other streaming providers. For example, the streaming provider may bid on the entity-action pair of {entity="Sheriff Bob", action="Stream Now"} and compete in an auction only against other streaming providers. The DVD retailer may also opt to bid on another entity-action pair such as {entity="Sheriff Bob", action="Purchase DVD"} in addition to, or in lieu of, bidding on specific search terms.

According to various implementations, the system may be configured to facilitate the matching of an entity-action pair to content from a third-party content provider. In some implementations, the system receives a feed containing data regarding the inventory of a provider. The feed may be, but is not limited to, a text file, a structured data file (e.g., an XML file, a JSON file, etc.), or a spreadsheet. Each item in the feed may correspond to an actual item or service being offered by the content provider. Feed items may be analyzed by the system to identify a corresponding search entity and/or online action associated with the identified search entity. Identified entity-action pairs may also be associated with auction parameters set by the third-party provider and used by the system to place bids in content auctions regarding the entity-action pairs. For example, a streaming provider may upload a feed containing some or all of the content the provider currently has available to stream. An uploaded feed may also be associated with auction parameters (e.g., bid amounts, budgets, etc.), such as those found within an advertising campaign. Thus, the streaming provider may place an advertisement whenever one of the available movies in the feed and the online action of streaming is related to a given search query. In various implementations, a third-party content provider may receive feedback from the system regarding the matching process. For example, the provider may receive a listing of errors corresponding to the system being unable to match a particular feed item to a search entity or multiple search entities being matched to a single feed item.

For situations in which the systems discussed here collect personal information about users, or may make use of personal information, the users may be provided with an opportunity to control whether programs or features collect personal information (e.g., information about a user's social network, social actions or activities, a user's preferences, or a user's current location), or to control whether or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Referring to FIG. 1, a block diagram of a computer system 100 in accordance with a described implementation is shown. System 100 includes a client device 102 which communicates with other computing devices via a network 106. Client device 102 may execute a web browser or other application (e.g., a media player, a social networking application, a navigation program, etc.) to retrieve content from other devices over network 106. For example, client device 102 may communicate with any number of content sources 108, 110 (e.g., a first content source through nth content source). Content sources 108, 110 may provide webpage data and/or other content, such as images, video, audio, or an application to client device 102. Computer system 100 may also include a search service 104 configured to perform a web search in response to a search query received from client device 102. For example, search service 104 may return hyperlinks or other resource identifiers for any of content sources 108-110 to client device 102 based on a given search query. For example, search service 104 may provide a hyperlink to content source 108, if content source 108 serves a webpage devoted to golf and client device 102 requests a search for golf-related content.

Network 106 may be any form of computer network that relays information between client device 102, content sources 108, 110, and search service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT5 cable, etc.) to other computing devices in network 106.

Client device 102 may be of any number of different types of user electronic devices configured to communicate via network 106 (e.g., a laptop computer, a desktop computer, a tablet computer, a smartphone, a digital video recorder, a set-top box for a television, a video game console, combinations thereof, etc.). Client device 102 is shown to include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language.

Client device 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116, which displays webpages and other content received from content sources 108, 110, and/or third-party content selected by search service 104.

Content sources 108, 110 may be one or more electronic devices connected to network 106 that provide content to client device 102. For example, content sources 108, 110 may be computer servers (e.g., FTP servers, file sharing servers, web servers, etc.) or a combination of servers (e.g., data centers, cloud computing platforms, etc.). Content may include, but is not limited to, webpages, audio data, video data, and other forms of data files (e.g., spreadsheets, text files, images, etc.). Similar to client device 102, content sources 108, 110 may include processing circuits having processors 124, 118 and memories 126, 128, respectively, that store program instructions executable by processors 124, 118. For example, the processing circuit of content source 108 may include instructions such as web server software, FTP serving software, and other types of software that cause content source 108 to provide content via network 106.

Similar to content sources 108, 110, search service 104 may be one or more electronic devices connected to network 106 that provides data to client device 102 for presentation to a user. Search service 104 may include a computer server (e.g., an FTP server, file sharing server, web server, etc.) or a combination of servers (e.g., a data center, a cloud computing platform, etc.). Search service 104 may include a processing circuit including a processor 120 and a memory 122 that stores program instructions executable by processor 120. In cases in which search service 104 represents a combination of servers or other computing devices, processor 120 represents their collective processors and memory 122 represents their collective memories.

Search service 104 is configured to provide a listing of webpages or other online services available from content sources 108, 110 in response to a search query. In some implementations, search service 104 may maintain an index of keywords or topics of the webpages or other services available from content sources 108, 110. For example, search service 104 may use text and/or image recognition on a webpage from content source 108 to identify keywords or a topic of the webpage. In response to receiving a search query from client device 102, search service 104 may match the search query to the index, to determine the best matching webpages or other services from content sources 108, 110. The received search query may be in text form or may be converted into text form by search service 104 (e.g., search service 104 may use voice recognition to convert a spoken search query into text form). Search service 104 may then provide the network addresses of the matching webpages or other services to client device 102 for presentation on display 116 or via another user interface device. For example, the search results may be presented as hyperlinks on a webpage-based search result screen, as links in a stand-alone application, or as audible search results played by a speaker of client device 102. Since the search results were specifically requested by client device 102, they may be considered as being first-party content.

According to various implementations, search service 104 may also be configured to identify one or more search entities related to a search query received from client device 102. In many cases, a search entity corresponds to a named entity in the physical world (e.g., a particular person, place, piece of media content, etc.). In contrast to search results which may differ depending on the exact phrasing of a search query, a search entity may be configured to represent the actual concept underlying a search. For example, the search queries for "Sheriff Bob the Movie" and "Sheriff Bob reviews" may yield different search results from search service 104. In the former case, the search results may include links to webpages that provide facts about the Sheriff Bob movie (e.g., when the movie was released, who stars in the movie, the movie's budget, etc.). In the latter case, the search results may instead include links to webpages that review the Sheriff Bob movie. Underlying both searches, however, is the concept of the Sheriff Bob movie. In some implementations, search service 104 may analyze a given search query to determine the search entity most likely underlying the search. Thus, search service 104 may determine that both searches relate to the search entity for the Sheriff Bob movie.

Search entities may be related to one another. For example, the search entity for the actor, "John Doe," may be related to the search entity for the movie "Sheriff Bob," if John Doe starred in the movie. Relationships between search entities may be any type of relationship between their corresponding physical entities. For example, two locations may be related based on their proximity to one another, a piece of media content (e.g., a song, movie, album, etc.) may be related to an actor or musician that performed in the media content, or two people may be related by blood, marriage, or adoption. In some implementations, two search entities may be related based on how often searches for the two entities originated from the same source. For example, users that are interested in the actor John Doe may also be interested in Kapinski the Singing Koala, even though the two never appeared in the same movies together and are not otherwise related. If a high enough number of users searched for both entities, however, the two may be related based on the users' interests. In further implementations, search entities may be related based on semantics (e.g., search entities that have the same or similar names). For example, the "Leaning Tower of Pisa" search entity corresponding to the landmark in Pisa, Italy may be related to the "Leaning Tower of Shoes" search entity corresponding to a particular shoe store located in Bangor, Me., since a search query of "Leaning Tower" may relate to either of the two entities.

In various implementations, a search entity used by search service 104 may also have one or more online actions associated with it, thereby forming one or more entity-action pairs. Online actions may be any type of actions that can be performed regarding a particular search entity. Examples of online actions may include, but are not limited to, getting directions to a particular event or location, downloading or streaming a particular piece of media content, making an online purchase, making reservations (e.g., at a restaurant, hotel, airline, etc.), playing a game, making a donation to a particular charity or other organization, signing up for email or text alerts, navigating to a particular website, contacting a particular person or entity, reading reviews about a product or service, comparing prices across retailers, shopping for a product or service, saving an offer for a product or service, purchasing a product or service, getting a quote for a product or service, getting more information from a third-party provider regarding a product or service, joining or enrolling in a program (e.g., joining a streaming service, etc.), making an appointment, setting up a service (e.g., cable television, satellite television, Internet connectivity, etc.), viewing an email, tracking a package, creating an event for a social networking system, or checking in to a business (e.g., an airline, a hotel, etc.). The types of online actions associated with a search entity may also depend on the type of the entity. For example, actions relating to downloading or streaming may only be associated with search entities for media content. In some implementations, search entities and/or their associated actions may be hardcoded or otherwise defined by the operator of search service 104. In further implementations, search entities and/or their associated actions used by search service 104 may be defined via an online project (e.g., an online encyclopedia or other open source project) or may be identified automatically by search service 104. For example, search service 104 may identify new search entities, their relationships, and/or any associated online actions when indexing the webpages or other services provided by content sources 108, 110.

Search service 104 may be configured to allow third-party content providers to provide their content in conjunction with search results to client device 102. For example, a third-party content provider, such as an advertiser, may compensate the operator of search service 104 for the ability to include a paid hyperlink with search results provided to client device 102. In some implementations, search service 104 may conduct a content auction to select which third-party content is provided with the search results. Such an auction may be conducted in real-time (e.g., in response to search service 104 receiving a search query), in near real-time, or at any time, in various implementations. In some cases, a third-party content provider may specify auction parameters that control how and when a bid is placed in a content auction on behalf of the provider. For example, a third-party content provider may specify bidding parameters that control the amount of the provider's bid in a given auction (e.g., a minimum bid, a maximum bid, a target bid, a budget, etc.). In some implementations, a third-party content provider may also specify one or more search terms or phrases to control when an auction bid is placed on the provider's behalf. For example, a third-party advertiser may specify that they wish to place an advertisement link with search results, whenever a client device searches for the phrase "Leaning Tower of Shoes." Such an advertisement may be a hotlinked image, a hyperlink denoted as being a paid advertisement within the search results, or other form of third-party content presented in conjunction with the search results.

Auction parameters may be received by search service 104 in any number of different ways. In some implementations, search service 104 may receive auction parameters from a third-party content provider via a webpage-based input mechanism or via a stand-alone application (e.g., an application specifically configured to provide data to search service 104). In other words, search service 104 may provide a user interface to third-party content providers to specify auction-related data to search service 104. In further implementations, search service 104 may receive auction parameters via a feed from a third-party content provider. A feed may be any form of text-based data that contains auction parameters and may be uploaded to search service 104.

According to some implementations, search service 104 may be configured to associate auction parameters with a particular search entity or entity-action pair. In contrast to auction parameters focused on particular sets of search terms, an entity-action pair may underlie any number of different search queries. In response to receiving a search query from client device 102, search service 104 may identify the most likely search entity underlying the search, any other search entities related to it, and/or any entity-action pairs for the search entity. By tying third-party content to particular entity-action pairs, third-party content providers may compete in content auctions against other providers that offer the same products or services. For example, a third-party content provider may specify auction parameters via search service 104 that their content is related to the entity-action pair of {Sheriff Bob, stream}, e.g., the provider runs a streaming service that has the Sheriff Bob movie available for streaming. If the provider were to use search terms instead, he or she may be competing against other providers that offer different services. For example, the streaming provider may compete against another third-party provider that sells DVD copies of the Sheriff Bob movie when the search term "Sheriff Bob" is received by search service 104. In cases in which the profit margins for the different services or products also differ, this could lead to the higher margin product or service always being selected, since their corresponding providers may be willing to use higher bid amounts. By tying auction parameters to entity-action pairs, however, a streaming provider may compete against other streaming providers, a DVD retailer may compete against other DVD retailers, etc.

After identifying the most relevant search entity to a received query, search service 104 may rank any online actions or other search entities related to the entity. In some implementations, search service 104 may do so based on the terms used in the search query. For example, a search query for "Sheriff Bob streaming" may be more closely related to the entity-action pair of {Sheriff Bob, stream} than an entity-action pair regarding purchasing a DVD copy of the movie. Search service 104 may use such a ranking to determine which, if any, content auctions are to be performed. For example, search service 104 may determine that content auctions are to be conducted for the top five ranked entity-action pairs for a given search query. In some implementations, search service 104 may select multiple third-party content providers for a given entity-action pair. For example, the top two bidders in a content auction for the entity-action pair of {Sheriff Bob, stream} may be allowed by search service 104 to include their content for presentation with search results from the service. In some implementations, search service 104 may conduct a content auction as a second-price auction (e.g., the top bidder actually pays the second highest bidder's amount, the second highest bidder pays the third-highest bidder's amount, etc.). In other implementations, search service 104 may conduct a first-price auction, a Vickrey-Clark-Groves (VCG) auction, a lifetime value (LTV) auction, or any other type of auction. In further implementations, search service 104 may impose a threshold cap on the number of third-party content providers that can win a given content auction. For example, search service 104 may impose a maximum of three advertisements for a given entity-action pair. In yet further implementations, search service 104 may select third-party content based in part on a quality score or other metric for the third-party content's provider. For example, a click through rate (e.g., a measure of how likely a user is to click on the provider's content) may be used in addition to, or in lieu of, the provider's content auction bid to determine whether or not the provider's content will be shown with the search results. In other words, a third-party content provider that has the highest auction bid may nonetheless be passed over for content selection if the provider has a low quality score. Entity-action pairs may also have associated reserve prices set in search service 104 such that one or more bids must be above the reserve price before its associated content will be selected for presentation with the search results.

Search service 104 may vary the visual layout of third-party content in accordance with its ranking of a search entity's relationships. In various implementations, the visual layout of third-party content may be varied such that the content is displayed more prominently (e.g., if the content is closely related to the search query) or less prominently (e.g., if the content is more distally related to the search query).

According to various implementations, search service 104 is configured to facilitate the matching of a search entity to a good or service being offered by a third-party content provider. In some implementations, search service 104 may receive a feed from a computing device operated by a third-party content provider (e.g., content source 110), each feed item corresponding to a good or service being offered. For example, assume that content source 110 is operated by an online retailer that sells hardcopies of books. In such a case, the retailer may upload a feed to search service 104 that contains a listing of some or all of the books available from the retailer. In response, search service 104 may analyze the feed and identify search entities that correspond to the various books. Actions associated with the search entities may be provided explicitly by the content provider or may be determined by search service 104 based on data in the feed (e.g., search service 104 may determine that the online action associated with the feed items is "purchase book"), thereby forming entity-action pairs with the identified search entities. In some implementations, search service 104 may generate one or more reports on the matching of feed items to search entities. For example, search service 104 may generate and provide a report listing all feed items that were successfully matched to search entities. In another example, search service 104 may generate and provide a report listing all feed items that could not be uniquely matched to a search entity (e.g., no search entities were matched to a particular feed item, multiple search entities were matched to a particular feed item, etc.).

In some implementations, entity-action pairs identified by search service 104 via an uploaded feed may be associated with third-party content. For example, identified entity-action pairs may be associated with an ad group or an advertising campaign that includes third-party content. The third-party content may be any form of content associated with performing an online action relative to a search entity. Third party content may include, but is not limited to, a hyperlink to a third-party content provider's website or a set of machine instructions that cause an application executed by client device 102 to perform the action. For example, clicking on third-party content related to a {song, purchase download} entity-action pair may cause a marketplace application on client device 102 to complete the purchase and download of the corresponding song. Third-party content may also include text, images, or other media (e.g., audio, video, etc.) to indicate an online action associated with a search entity.

Third-party content associated with entity-action pairs may also be grouped or categorized by search service 104. For example, a third-party content provider may group content in different campaigns (e.g., advertising campaigns) or content subgroups of campaigns. For example, a retailer that operates a streaming service and also sells DVD copies of movies may create separate campaigns for each product type on search service 104. In some implementations, the matching of identified entity-action pairs from a feed to a campaign or ad grouping is received explicitly from the third-party content provider. In other implementations, search service 104 is configured to automatically match entity-action pairs in an uploaded feed to a particular campaign or other grouping of content. For example, search service 104 may identify items in a feed as e-books and match the identified entity-action pairs to a campaign devoted to selling e-books.

In cases in which search service 104 conducts a content auction to determine which third-party content associated with an entity-action pair is provided to client device 102, entity-action pairs identified by search service 104 may also be associated with auction parameters. Auction parameters may include any form of parameters that control the bidding in a content auction by a third-party content provider. For example, auction parameters may include a target bid amount, a minimum bid amount, a maximum bid amount, one or more budget constraints (e.g., a daily budget, a weekly budget, etc.), or timing information that defines a time period in which bids are placed. The auction parameters may be associated with a particular campaign or other grouping of third-party content, in some implementations (e.g., a campaign may have auction parameters).

In various implementations, search service 104 may conduct content auctions for entity-action pairs in the same manner as content auctions for search terms. In such cases, search service 104 may generate "fake" keywords to represent specific entity-action pairs. For example, assume that client device 102 sends a search query of "Sheriff Bob show times in Atlanta." Based on this query, search service 104 may conduct a content auction among third-party content providers that specified the same or similar keywords in the query. In addition to the keyword-based auction, or in lieu thereof, search service 104 may also conduct a separate content auction for the entity-action pair of {search entity="Sheriff Bob", action="purchase tickets"}. Search service 104 may use the set of keywords "Sheriff Bob (2014) 45aE5" to conduct an auction for the entity-action pair, where 45aE5 represents a unique identifier for the search entity or entity-action pair. In other words, a fake keyword may be uniquely associated with a particular search entity or entity-action pair and used by search service 104 as part of a content auction.

Figure 2:
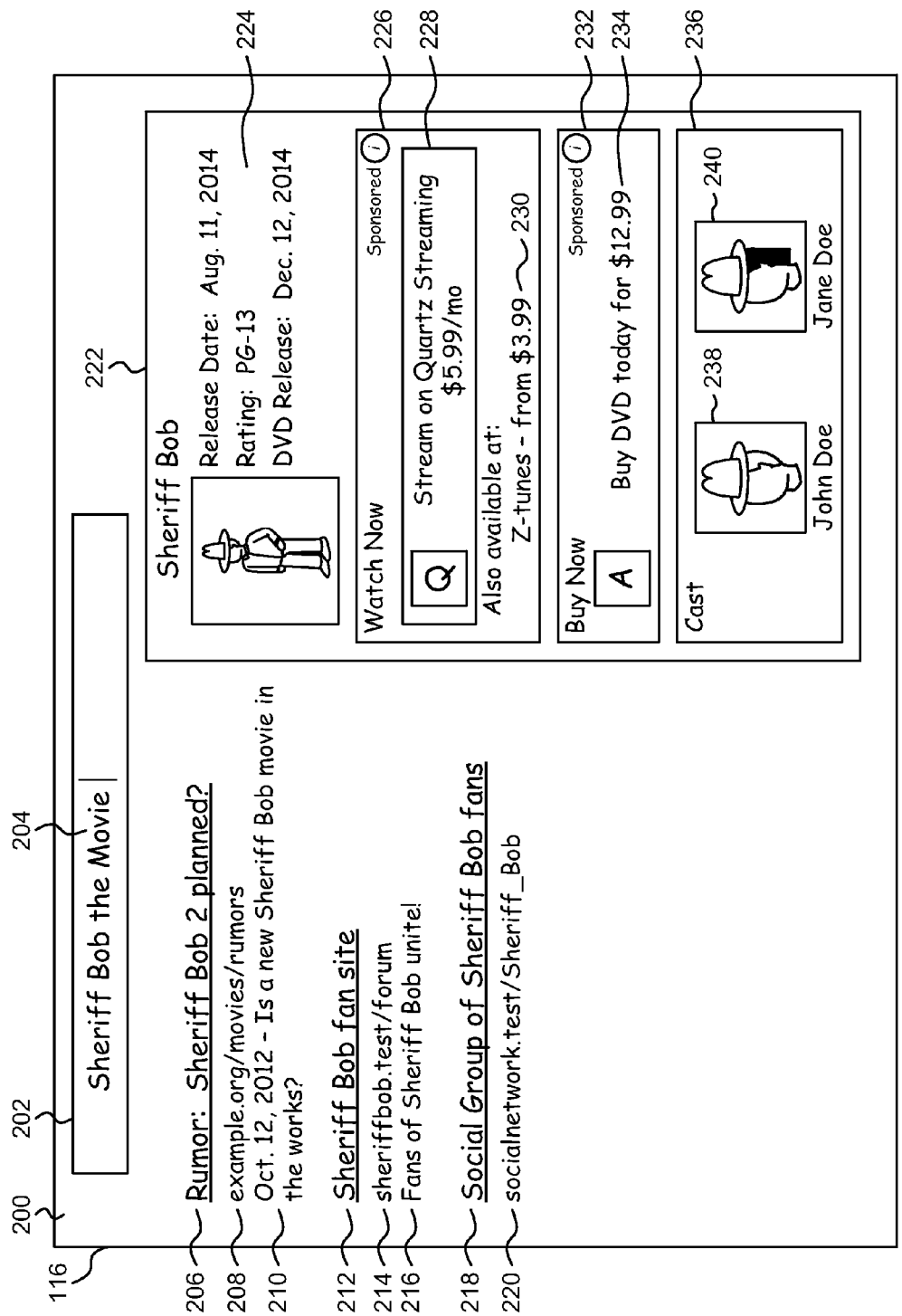
FIG. 2 is an example illustration of an electronic display showing a search entity on a search result screen.

Referring now to FIG. 2, an illustration is shown of an electronic display showing a search entity on a search result screen, according to some implementations. In the example shown, search result screen 200 may be provided to the electronic display 116 of client device 102 in response to client device 102 sending a search query to search service 104. In some implementations, search result screen 200 may be a webpage provided by search service 104 to client device 102 and presented on electronic display 116 via an executed web browser application. In other implementations, search result screen 200 may be presented on electronic display 116 via a stand-alone application executed by client device 102. A stand-alone application may be specifically configured to send search requests to search service 104 and to receive search results therefrom. Some or all of the content presented on search result screen 200 may be provided by search service 104 to client device 102, in various cases.

Search result screen 200 may include a search query input field 202 configured to receive a search query 204 from a user interface device. In some implementations, search query input field 202 may be presented directly on or with search result screen 200. For example, search results presented on search result screen 200 may be dynamically updated based on the current search query entered via input field 202 (e.g., changing search query 204 to be a different search query may cause different search results to be presented). In other implementations, search query input field 202 may be presented on a different screen than that of search result screen 200. For example, client device 102 may navigate from a search query screen to search result screen 200 in response to a search query being performed.

In the example shown, assume that the text "Sheriff Bob the Movie" has been entered into input field 202 as search query 204 and that a search has been initiated (e.g., in response to the Enter key being pressed on a keypad, in response to a pointing device selecting a search-related button, etc.). In response, search query 204 may be communicated to search service 104 and used by the service to retrieve any number of links to webpages or other online services related to search query 204. Search service 104 then may return the identified links and any corresponding data to client device 102 for presentation on search result screen 200. Search result screen 200 may include any number of hyperlinks for webpages or other online resources that relate to search query 204. For example, the highest ranked search result may correspond to a webpage that publishes rumors regarding a Sheriff Bob sequel, the second highest ranked search result may correspond to a webpage that allows fans of the Sheriff Bob movie to post messages, and the third highest ranked search result may be to a social networking group of Sheriff Bob fans. The search results may have hyperlinks 206, 212, 218, respectively, which are configured to redirect client device 102 to the webpages when clicked. In some cases, the search results may also have indications 208, 214, 220 of the network addresses associated with hyperlinks 206, 212, 218. For example, indication 208 on search result screen 200 may indicate that clicking hyperlink 206 will cause client device 102 to navigate to the webpage located at http://www.example.org/movies/rumors. In some implementations, additional information regarding the search results may also be presented as part of search result screen 200. For example, information 210, 216 may include information regarding when the webpage was last updated, a preview of text or images appearing on the webpage, or other such information.

In some cases, search service 104 may conduct a content auction using the keywords of search query 204 to select sponsored search results (e.g., third-party content that appears as normal search results). For example, one or more of hyperlinks 206, 212, 218 may be a sponsored link to the website of a third-party content provider. In this type of auction, third-party content providers place bids for the specific keywords of search query 204 or for a broad match of keywords specified by a third-party content provider.

According to various implementations, search service 104 may also use search query 204 to identify one or more search entities related to search query 204. For example, search service 104 may determine that search query 204 is most closely related to the search entity for the Sheriff Bob movie. In some implementations, search service 104 may provide information regarding the identified search entity to client device 102 for presentation within a knowledge panel 222. For example, search service 104 may provide various facts 224 to client device 102 for presentation within knowledge panel 222. These facts may include general information about the Sheriff Bob search entity, such as when the movie was first released, the movie's rating, when the DVD of the movie was released, or other such information. In various implementations, a search entity may or may not be identified and presented by search service 104, depending on the search query. For example, a generic search for "new DVD releases" may not result in a search entity being identified. In some cases, a content auction for the specific keywords of the search query may still be conducted by search service 104 (e.g., to include one or more sponsored links with hyperlinks 206, 212, 218).

In addition to, or in lieu of, presenting facts 224 as part of knowledge panel 222, search service 104 may also select and provide additional content for presentation as part of knowledge panel 222 based on the relationships between the Sheriff Bob search entity, other search entities, and/or any online actions. In some cases, search service 104 may rank the related entities and/or actions based in part on search query 204. For example, search service 104 may determine that search query 204 does not include any search terms directly related to an online action, but that streaming Sheriff Bob and purchasing a DVD of the movie are the top two most popular online actions for the search entity. In such a case, search service 104 may conduct separate content auctions for the identified {Sheriff Bob, stream} and {Sheriff Bob, buy DVD} entity-action pairs. Links to the auction winners' websites or services may then be provided by search service 104 for presentation within knowledge panel 222. As shown, a first panel 226 may be presented as part of knowledge panel 222 based on the results of the auction for the {Sheriff Bob, stream} entity-action pair. Similarly, a second panel 232 may be presented as part of knowledge panel 222 based on the results of the auction for {Sheriff Bob, buy DVD} entity-action pair.

Each of panels 226, 232 may include third-party content from any number of different providers that have opted to associate their content with entity-action pairs. In some implementations, search service 104 may impose a maximum number of auction winners for each entity-action type. For example, the entity-action pair to stream the Sheriff Bob movie may allow third-party content to be presented by two different providers at once, while the entity-action pair to purchase the Sheriff Bob DVD may allow third-party content from a single provider to be presented at any given time. Each of panels 226, 232 may also include an indication that they contain third-party content. For example, panels 226, 232 may self identify themselves as containing sponsored content, thereby distinguishing their third-party content from the first-party search results on screen 200.

Third party content presented in panels 226, 232 may include hotlinks to their respective provider's websites or services, in some implementations. For example, panel 226 may include third-party content 228 (e.g., a link to one provider's streaming service) and third-party content 230 (e.g., another link to a different provider's streaming service). Similarly, panel 232 may include third-party content 234 (e.g., a link to a provider's retail website that sells the Sheriff Bob DVD). In some implementations, third-party content may also include additional information, such as a cost associated with the online action. Panels 226, 232 may include indicia regarding the name of the third-party content provider, a logo for the third-party content provider, a price associated with the provider's product or service, or other such information. For example, third-party content 228 may include the price to join its corresponding provider's streaming service (e.g., the streaming service costs $5.99 per month). In another example, third-party content 230 may include information regarding the cost to stream only the Sheriff Bob movie from another provider.

Search service 104 may determine that other search entities are related to the Sheriff Bob search entity and should be presented as part of knowledge panel 222. For example, assume that the Sheriff Bob movie stars the actor "John Doe" and the actress "Jane Doe." Each of these performers may have their own corresponding search entity. In such a case, search service 104 may also provide a panel 236 for presentation in knowledge panel 222 that includes search entities 238, 240 (e.g., links to the search entities for John Doe and Jane Doe, respectively). Selecting either of these links using an input device may cause knowledge panel 222 to be updated with the corresponding search entity and/or cause search query 204 to be updated and a new search conducted for the corresponding entity.

In some implementations, search service 104 may determine the visual layout of knowledge panel 222 and its constituent components based on search query 204. Search service 104 may determine how closely related an entity-action pair or other search entity is to search query 204, so that they can be ranked. For example, search service 104 may determine that search query 204 is broadly related to the search entity for the Sheriff Bob movie. Search service 104 may also determine how related any other entity-action pairs are to the search and/or any other search entities that may be related to the entity for the Sheriff Bob movie. Search service 104 may also determine the strength of these relationships based on how closely the search query matches the entities and entity-action pairs, on how often users click on the related entities and entity-action pairs when presented, or both. Using the strength of these relationships, search service 104 may select which search entity is to appear in knowledge panel 222, which entity-action pairs are to appear in knowledge panel 222 (e.g., which types of third-party content are to be presented), and/or which secondary search entities are to appear in knowledge panel 222 (e.g., search entities 238, 240 may be presented based on their relationship to the Sheriff Bob search entity). In some implementations, search service 104 may simply select the highest ranked entity-action pairs or search entities for presentation in knowledge panel 222. In other implementations, search service 104 may also determine which content is to appear in knowledge panel 222 based on the results of a content auction. For example, an entity-action pair may receive a lower ranking if its winning bids are lower than for other entity-action pairs or may receive a higher ranking if its winning bids are higher than for other entity-action pairs. In some cases, an entity-action pair may lose its ranking if its content auction bids are below a reserve auction price used by search service 104.

Search service 104 may vary the visual layout of knowledge panel 222 to emphasize higher ranked content and deemphasize lower ranked content. In various implementations, search service 104 may emphasize a secondary search entity or third-party content associated with a highly ranked entity-action pair by positioning the content towards the top of knowledge panel 222 (e.g., towards the top of search result screen 200), using a larger font than other content in knowledge panel 222, including an icon or graphic with the content, adding a highlighting to the content, or using any other visual means to draw a user's attention towards the third-party content. In further implementations, search service 104 may deemphasize a secondary search entity or third-party content associated with a lower ranked entity-action pair by positioning the content towards the bottom of knowledge panel 222 (e.g., further towards the bottom of search result screen 200), using a smaller font than other content in knowledge panel 222, removing an icon or graphic from the content, or using any other visual means to deemphasize the content on search result screen 200.

Figure 3:
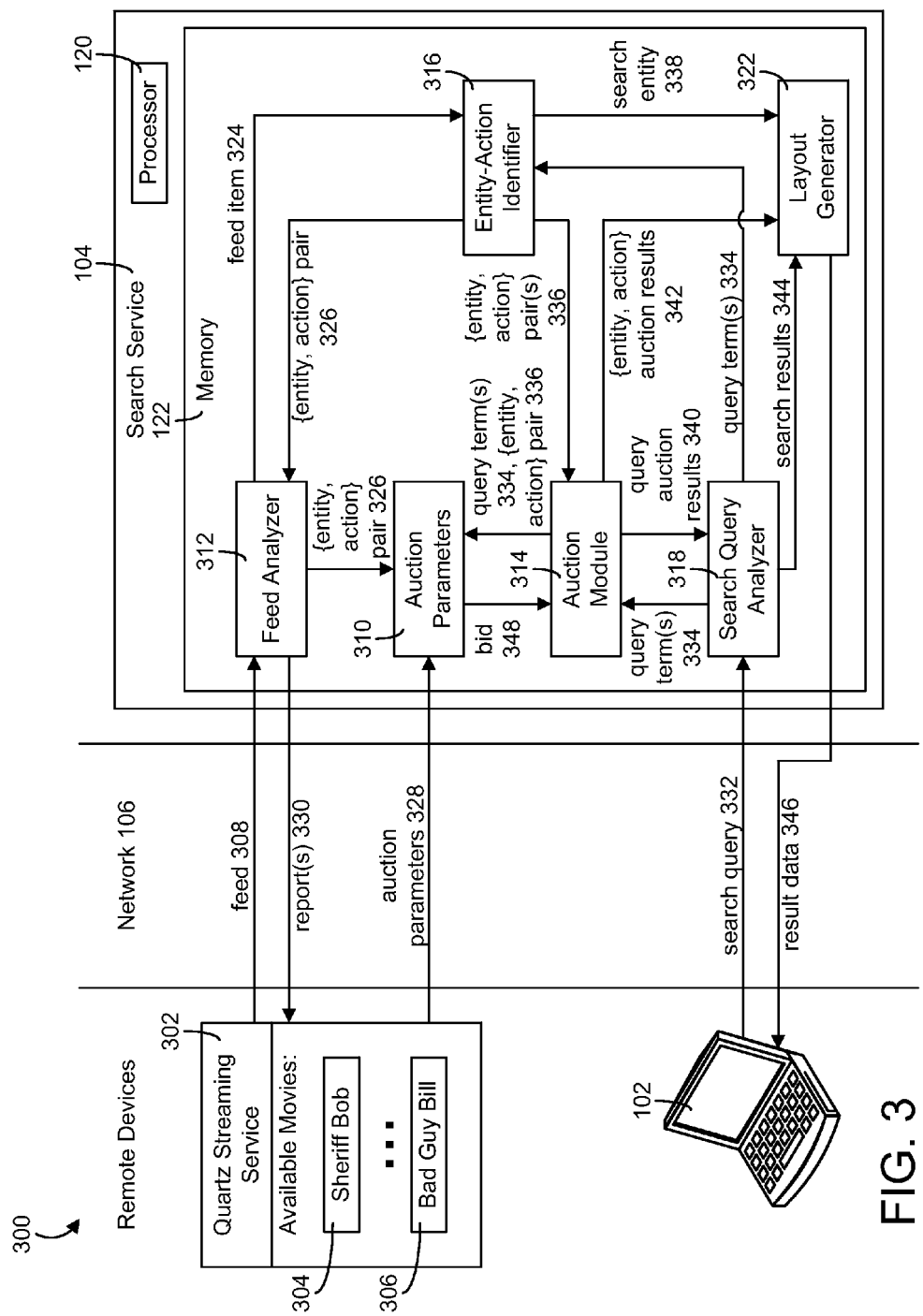
FIG. 3 is a detailed diagram of the system of FIG. 1 using a feed to select third-party content for a search entity, according to one implementation.

Referring now to FIG. 3, a detailed diagram 300 is shown of computer system 100 from FIG. 1 in greater detail, according to one example. As shown, assume that a third-party content provider operates a streaming service 302 (e.g., the Quartz Streaming Service") that communicates via network 106 with search service 104 and/or client device 102. In other implementations, service 302 may be any other form of online service configured to perform an online action relative to a search entity. For example, service 302 may be configured to allow users to make reservations (e.g., restaurant reservations, hotel reservations, transportation reservations, etc.), purchase hardcopies of media (e.g., movies, software, music, books, etc.) or other goods, purchase digital or streaming copies of media, or subscribe to an online service. Search service 104 is also shown to include various software modules 312-318 stored in memory 122 that, when executed by processor 120, cause processor 120 to perform the operations described herein.

In the example shown, assume that Quartz streaming service 302 has a catalog of streaming movies ranging from the Sheriff Bob movie 304 to the Bad Guy Bill movie 306 (e.g., a first through nth movie available for streaming via the service). Also, assume that streaming service 302 charges a flat, monthly fee for access to its streaming movie catalog. To attract new users to the service, a feed 308 may be uploaded to search service 104 containing a listing of one or more of movies 304-306 available from streaming service 302. Search service 104 may analyze each feed item in feed 308, attempt to match each feed item to an entity-action pair, and associate the identified entity-action pairs with auction parameters 328 specified by the content provider. In response to a search query 332 related to a search entity that represents one of movies 304-306, search service 104 may conduct a content auction for the corresponding entity-action pair. A link to streaming service 302 may then be included in result data 346 by search service 104 and presented in conjunction with the search entity. For example, result data 346 may include a link to streaming service 302 labeled "Stream on Quartz Streaming for $5.99/month" presented in conjunction with the "Sheriff Bob" search entity, as illustrated in FIG. 2.

According to various implementations, search service 104 includes a feed analyzer 312 configured to analyze and process a received feed, such as feed 308. Feed 308 may be a text file (e.g., a .txt file), a compressed file (e.g., a .zip file, a .gz file, a .bz2 file, etc.), a spreadsheet file (e.g., a .xls file), a file in a structured data format (e.g., a .xml file, a .json file, etc.), or any similar type of file suitable to group data fields into a feed item. Data fields in a feed item may be character delimited (e.g., comma delimited, semicolon delimited, etc.), space delimited (e.g., tab delimited), or separated in any other way. In some implementations, feed analyzer 312 may parse feed 308 according to a standardized feed format. For example, feed analyzer 312 may require feeds to include common parameters used across all feed types (e.g., movie-related feeds, song related feeds, etc.). Such common parameters may be formatted as follows:

TABLE 1

| Parameter Name | Required? | Repeated? | Description |
| --- | --- | --- | --- |
| Feed_item_ID | yes | no | An item ID that is unique across all feeds of a third-party content provider |
| type | yes | no | Feed item type (e.g., movie, album, song, book, etc.) |
| action | yes | no | Action name (e.g., subscribe to a service, make a purchase, etc.) |
| Landing_page | yes | no | The URL of the webpage where the action can be performed |
| price | yes | no | The price to be paid by a user to perform the online action |
| Subscription_period | yes, if the action is a service subscription | no | Indicates the subscription period (e.g., daily, weekly, monthly, yearly, etc.) |
| Expiration date | no | no | Indicates the final date the parameters will be used to provide third-party content |

For a feed that includes movie-related feed items such as feed 308, feed analyzer 312 may also utilize the following feed format:

TABLE 2

| Parameter Name | Required? | Repeated? | Description |
| --- | --- | --- | --- |
| Feed_item_name | yes | no | |
| type | yes | no | Allowed value: movie |
| Movie_title | yes | no | Full title of the movie (e.g., the name of the search entity) |
| Release_year | yes, if no ID is given | no | Year of release |
| MID1 | no | no | Movie Identifier (e.g., a unique identifier for a movie used by one provider) |
| MID2 | no | no | Movie Identifier (e.g., a unique identifier for a movie used by a second provider) |
| ... | | | |
| MIDN | no | no | Movie Identifier used by an nth provider. |
| action | yes | no | Allowed action for the movie (e.g., stream, subscribe to a streaming service, purchase, etc.) |
| Landing_page | yes | no | |
| price | yes | no | |
| Subscription_period | no | no | |

As shown in Table 2, the italicized parameters represent parameters that are common to feeds for other types of search entities. Using this format, one example of feed 308 is shown below:

TABLE 3

| Feed_item_ID | type | Movie_title | Release_year | MID | action | Landing_page | price |
|---|---|---|---|---|---|---|---|
| Item_0 | movie | Sheriff Bob | 2014 | A4 | Subscribe | http://a.test/242 | 5.99 USD |
| Item_1 | movie | Bad Guy Bill | 2014 | D3 | Subscribe | http://a.test/242 | 5.99 USD |

In some implementations, feed analyzer 312 may validate feed items in feed 308 to ensure that the data in feed 308 is properly formatted. For example, feed analyzer 312 may verify whether each feed item includes data for any required data field, such as the feed item type. The results of the validation may be provided by search service 104 as part of one or more reports 330 that include successful validations and/or feed items that could not be validated.

Feed analyzer 312 may provide a validated feed item 324 in feed 308 to an entity-action identifier 316, which is configured to identify a search entity and/or entity-action pair in feed item 324. Entity-action identifier 316 may, in some cases, identify a search entity based on a unique identifier included in feed item 324 (e.g., a unique movie identifier), if one is included. In some implementations, entity-action identifier 316 may utilize heuristics on feed item 324 to search a knowledge graph for a matching search entity. A knowledge graph generally refers to a structured graph used in semantic searching where each node in the graph represents a unique search entity and links between entities represent the relationships between them. Each node may also include any number of facts for a search entity. For example, a node for the "Sheriff Bob" movie may include facts about the movie, such as its release date, list of characters, list of actors, or the like. Entity-action identifier 316 may search the knowledge graph by comparing facts and relationships for different search entity nodes to the data in feed item 324 to identify a matching search entity. In further implementations, feed analyzer 312 may use a machine learning model on feed item 324 to identify a search entity. Such a model may, for example, analyze the search entities matched using a heuristic search of a knowledge graph, match corrections supplied by third-party content providers, analyze vertical information associated with advertising campaigns, or the like, to identify the most likely search entity corresponding to feed item 324.

In some implementations, feed item 324 may explicitly include data regarding the action type. For example, feed item 324 may include data indicating that the action corresponds to subscribing to a streaming service, renting a movie via streaming, or purchasing a hardcopy of the movie. In other implementations, entity-action identifier 316 may analyze feed item 324 to determine the appropriate action (e.g., by analyzing a landing page listed in feed item 324, etc.).

Entity-action identifier 316 may provide any entity-action pair identified for a feed item to feed analyzer 312 for purposes of reporting. For example, entity-action identifier 316 may provide entity-action pair 326 to feed analyzer 312 identified from feed item 324. Entity-action identifier 316 may also provide an indication to feed analyzer 312 if no search entities are found for a particular feed item or if the feed item matches multiple search entities. Feed analyzer 312 may use the information received from entity-action identifier 316 to generate reports 330 that indicate successfully matched feed items and/or feed items in which an error occurred during the matching process (e.g., the feed item could not be uniquely matched to a search entity by entity-action identifier 316).

Search service 104 may associate any identified entity-action pairs from feed 308 with auction parameters 328 and store this data as auction parameters 310. In some cases, the received auction parameters 328 include bidding data, scheduling data, or budget data. In other case, the received auction parameters 328 include a request to associate feed 308 with an existing campaign or content grouping in auction parameters 310. For example, auction parameters 310 may include a parameter to link any identified entity-action pairs from feed 308 to an existing campaign having previously specified bidding data. Successfully identified entity-action pairs from feed 308 may be stored in auction parameters 310 by feed analyzer 312. For example, entity-action pair 326 identified from feed item 324 may be stored in auction parameters 310 and associated with a bid amount. Thus, the operator of streaming service 302 may easily set up auction parameters for entity-action pairs corresponding to some or all of movies 304-306 available from the service.

Client device 102 may send a search query 332 to search service 104, which is received by a search query analyzer 318. Search query analyzer 318 is configured to generate search results 344 based on search query 332. Search query analyzer 318 may identify the network addresses of websites or other online resources that most closely match search query 332. For example, if search query 332 is for the search terms "Sheriff Bob the Movie," search query analyzer 318 may identify network addresses 208, 214, and 220, as shown in FIG. 2.

In some implementations, search query analyzer 318 provides query terms 334 to an auction module 314 configured to conduct a content auction based on query terms 334. Some third-party content providers may specify one or more sets of keywords in auction parameters 310 that are used to control when bids are placed in the auction. Auction module 314 may compare the bid amounts to determine which third-party content is selected for presentation by client device 102. In some cases, auction module 314 may base the content selection as a function of a bid amount and a quality score associated with the content (e.g., a score that represents the likelihood that the user conducting the query will click on the content if selected). In response to conducting the auction, auction module 314 may provide query auction results 340 to search query analyzer 318. Query auction results 340 include third-party content that generally has the same or similar layout as search results 344. For example, query auction results 340 may include a sponsored link that is presented with the other search results generated by search query analyzer 318.

Search query analyzer 318 may also provide any query terms 334 in search query to entity-action identifier 316. In response, entity-action identifier 316 may identify a search entity 338 that matches or is related to query terms 334, if such an entity exists. Included in search entity 338 may be any facts associated with the search entity (e.g., the release date of a movie, trivia regarding the movie, etc.). In some cases, entity-action identifier 316 may not identify a search entity based on the received search terms. For example, a generic query that does not pertain to any particular named entity may not have a corresponding search entity. According to various implementations, entity-action identifier 316 also identifies one or more entity-action pairs 336 for search entity 338. In some implementations, entity-action identifier 316 also identifies any search entities and/or entity-action pairs related to search entity 338. For example, if search entity 338 corresponds to the Sheriff Bob movie and the singer/actor Jane Doe appears in the movie, entity-action identifier 316 may identify an entity-action pair to download a song by Jane Doe. In some implementations, entity-action identifier 316 generates a ranking of entity-action pairs based on their relationships to query terms 334. For example, an entity-action pair to stream Sheriff Bob may be closely related to a search query of "Sheriff Bob streaming," while an entity-action pair to download a song by Jane Doe may be more distally related to the search query.

Entity-action pairs 336 identified by entity-action identifier 316 may be provided to auction module 314 to conduct content auctions for the entity-action pairs. Auction module 314 may, for example, use one of the received entity-action pairs 336 to retrieve auction bids from auction parameters 310 for use in a content auction. For example, if one of entity-action pairs 336 matches entity-action pair 326 identified from feed 308, an auction bid 348 from streaming service 302 in auction parameters 310 may be used in the content auction conducted by auction module 314. Auction module 314 may compare received bids for entity-action pairs to generate auction results 342. In some cases, auction module 314 may also utilize a quality score to determine which third-party content is to be presented for a given entity-action pair. Auction results 342 may include data from feed item 324, such as a landing page (e.g., a webpage of streaming service 302), pricing information (e.g., $5.99 per month for the streaming service), and other such information. In various implementations, "fake" keywords (e.g., keywords not included in search query 332) may be used in auction parameters 310 to represent entity-action pairs and by auction module 314 to conduct content auctions for the entity-action pairs. Thus, auction module 314 may conduct content auctions for any number of sets of keywords based on a single search query 332 (e.g., a content auction for query terms 334 and one or more content auctions for fake keywords in auction parameters 310 that represent entity-action pairs).

Search service 104 may include a layout generator 322 configured to generate result data 346 in response to search service 104 receiving search query 332. Result data 346 is configured to cause a display of client device 102 to display search results 344 received by layout generator 322 from search query analyzer 318. Search results 344 may include, for example, hyperlinks to the search results or sponsored links selected by auction module 314 by conducting a content auction for query terms 334. If search query 332 is related to search entity 338 identified by entity-action identifier 316, layout generator 322 may also include search entity 338 in result data 346. Layout generator 322 may also receive auction results 342 for the content auctions conducted by auction module 314 for entity-action pairs 336. For example, layout generator 322 may receive data originating from feed item 324 that signifies that Sheriff Bob is available as part of the movie catalog of streaming service 302, which is available for $5.99/month. In some implementations, layout generator 322 arranges auction results 342 based on the ranking determined by entity-action identifier 316 and/or the bid amounts used to generate auction results 342. For example, third-party content for an identified entity-action pair may be excluded from result data 346 by layout generator 322 if the corresponding bids for that pair did not meet a reserve price. Layout generator 322 may also emphasize or deemphasize third-party content for entity-action pairs based on their relationships to search query 332. For example, third-party content that corresponds to an entity-action pair closely related to search query 332 may be visually emphasized while third-party content not as closely related to search query 332 is deemphasized.

Figure 4:
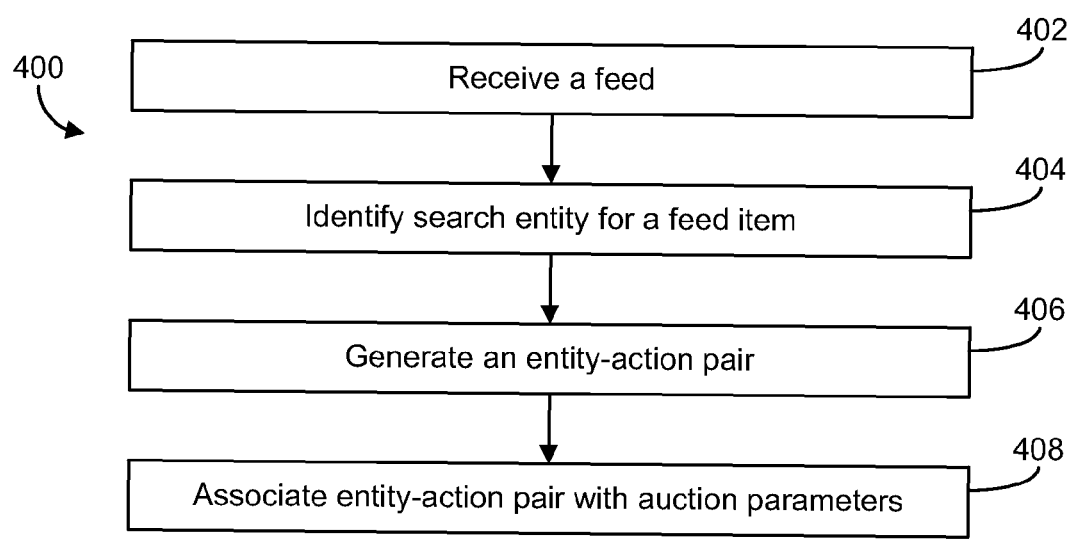
FIG. 4 is a flow diagram depicting the steps taken in one implementation of a process for using a feed to associate an entity-action pair with parameters for a content auction.

Referring now to FIG. 4, a flow diagram of a process 400 is shown for using a feed to associate an entity-action pair with parameters for a content auction, according to various implementations. As depicted in FIG. 4, a feed is received (step 402) and a search entity for a feed item is identified (step 404). An entity-action pair is generated (step 406) and associated with auction parameters (step 408). In general, process 400 allows any number of entity-action pairs to be identified and associated with auction parameters (e.g., bid amounts or the like). Process 400 may be implemented by a search service, such as search service 104 in FIG. 1. Process 400 may also be implemented by another device or set of devices working in conjunction with a search service to select third-party content for presentation with search results.

Still referring to FIG. 4, and in more detail, process 400 includes receiving a feed (step 402). The received feed may be a file of any type suitable to distinguish data fields for a feed item. For example, the file may be a text file, an XML file, a spreadsheet, a compressed file, or the like. In general, feed items in the feed may correspond to products, services, or other online actions available via a third-party content provider. For example, a feed may include a listing of movies, e-books, songs, etc. offered by the content provider. The feed may have required information for a particular type of feed item (e.g., the title of a movie, song, book, etc.) or may have optional information that can be used to further identify a search entity for the feed item. In some implementations, the feed may be validated to ensure that its format conforms to an expected format (e.g., the data fields in the feed appear in a prescribed order, required data fields are completed, etc.).

Process 400 includes identifying a search entity for a feed item in the received feed (step 404). According to various implementations and as shown above, a feed item includes identification data, a feed item type (e.g., whether the feed item relates to a movie, book, song, etc.), and an online action. The identification data may be any data used to match the feed item to a search entity (e.g., a release date, an address, a name, etc.). In some implementations, the identification data includes a unique identifier for a particular product, service, or action. For example, a feed item for a movie may include a unique identifier for the movie used by an online database of movies. The unique identifier may be matched to a search entity associated with the identifier, to identify the search entity. According to various implementations, the identification data in the feed item may be used to heuristically search a knowledge graph having search entities as nodes and relationships between search entities as paths between nodes. For example, the node for Sheriff Bob the movie may be linked to the node for John Doe the actor, since John Doe starred in Sheriff Bob. Potential errors associated with step 404 include not being able to identify any search entities and identifying more than one search entity. For example, a typographical error in the feed item may cause a search entity not to be matched to the feed item. In another example, assume that the Sheriff Bob movie was originally released in 1965 and that a digitally remastered version was released in 2014. If the feed item does not include any information to distinguish between these two, corresponding search entities for both versions of the movie may match the feed item.

Process 400 includes generating an entity-action pair for the feed item (step 406). An entity-action pair may be generated by associating an online action with the search entity identified in step 404. In some implementations, the online action may be explicitly specified by a third-party content provider. For example, the type of online action may be included in a feed item or associated with the received feed. In other words, the type of online action may be included as an actual data field in the feed item or may be included in data associated with the feed item (e.g., as part of a separately uploaded file, as part of a campaign linked to the feed, as part of a header of the feed, etc.). In other implementations, the online action may be inferred from the feed item. For example, assume that the feed item indicates a particular movie and a network address of a streaming service that charges a monthly subscription fee. In such a case, an online action of subscribing to the streaming service may be associated with the search entity for the movie without the action being explicitly specified by the content provider.

Process 400 includes associating the entity-action pair with auction parameters (step 408). Once an entity-action pair has been identified from a feed item, the pair may be associated with parameters used to control bidding in a content auction. In some implementations, the parameters may be associated with an existing campaign or other grouping. For example, an advertising campaign may include parameters that control when and how much is bid by a third-party content provider for the entity-action pair. In further implementations, the auction parameters may be received in conjunction with the feed or at a later time. For example, a bid amount may be specified when the feed is uploaded or included as part of the feed or a feed item.

Figure 5:
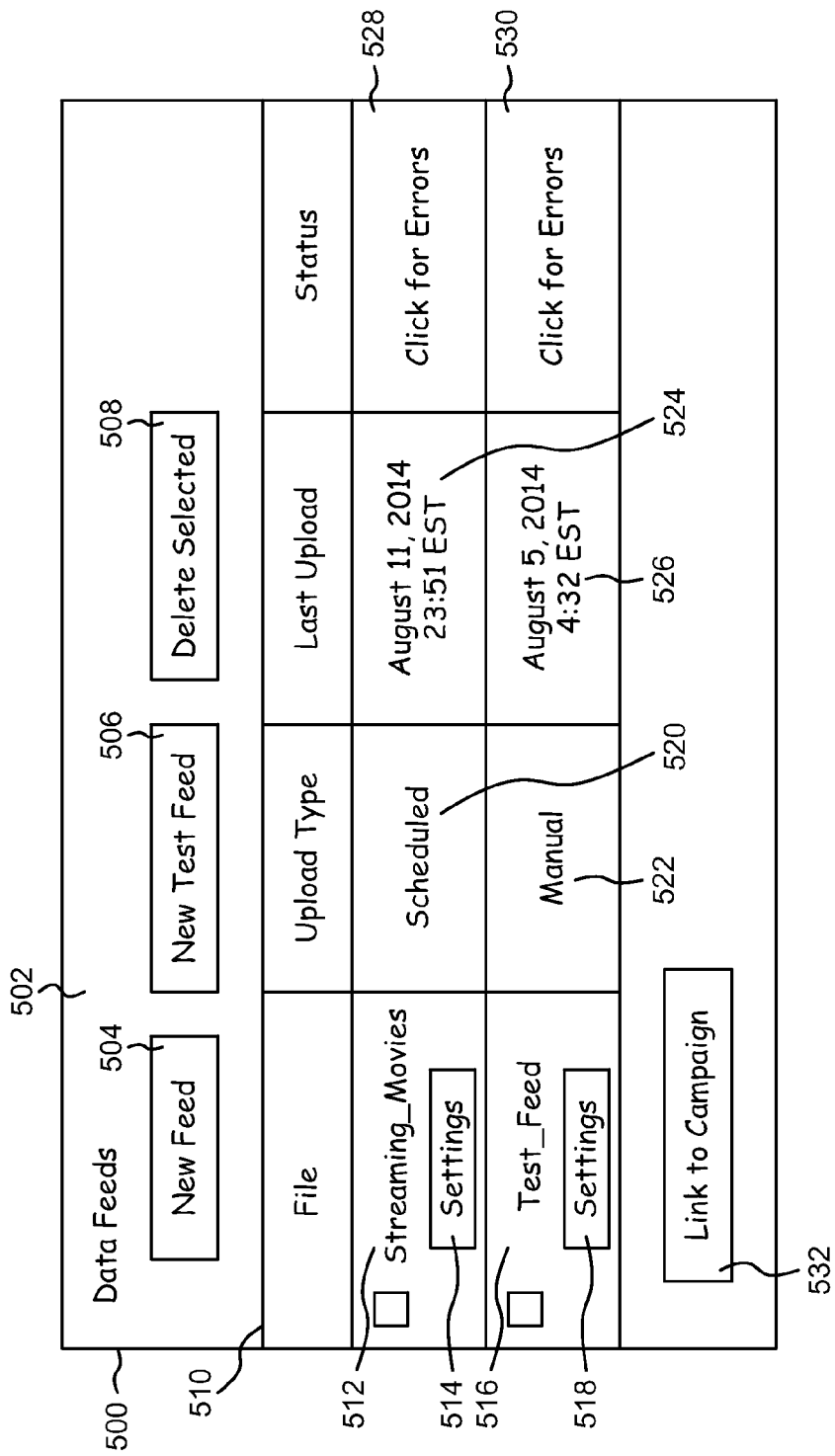
FIG. 5 is an illustration of one implementation of an electronic display showing an interface screen to manage search entity related feeds.

Referring now to FIG. 5, an example illustration is shown of an electronic display 500 showing an interface screen 502 to manage search entity related feeds. Electronic display 500 may be part of any electronic device operated by a third-party content provider or an agent thereof (e.g., an advertising agency). Screen 502 may be generated by a search service and provided to the electronic device for display by display 500. For example, search service 104 in FIG. 1 may provide screen 502 to the electronic device via network 106. As shown, screen 502 is generally configured to allow a third-party content provider to manage and test feeds for use with content auctions for entity-action pairs.

Screen 502 may include various inputs configured to create or delete feeds. For example, screen 502 may include an input 504 configured to create a new feed. Data regarding a new feed may be entered via a pop-up window or on another screen (not shown). Examples of data that may be entered for a new feed may include the file type of the feed, the location of the feed, when the feed should be re-uploaded, or the format for feed items in the feed. Similar to input 504, screen 502 may include an input 506 configured to allow a test feed to be uploaded. In some cases, a test feed may be used by a content provider to validate whether or not the feed conforms to the format used by the search service. Screen 502 may also include an input 508 configured to delete any of the existing feeds. For example, selection of feed 512 and input 508 may delete feed 512.

Screen 502 may include a portion 510 that includes information regarding existing feeds. In some implementations, the name of the file of a feed may be displayed. For example, feeds 512, 516 may be displayed on screen 502 if they had previously been uploaded. For each uploaded feed, screen 502 may include inputs 514, 518 configured to allow settings for a feed to be modified. Example feed settings may correspond to settings that allow a feed to be activated or placed in a hold state, settings that control the location of the file of the feed, and settings that control how often a feed is refreshed, if ever.

Screen portion 510 may include various data regarding feeds 512, 516. In some cases, screen 502 includes an upload type for each of feeds 512, 516. For example, status 520 may indicate that feed 512 is scheduled to be updated periodically. In another example, status 522 may indicate that feed 516 is only updated manually (e.g., in response to a request to update the feed). Screen portion 510 may also include timestamps 524, 526 for their corresponding feeds to indicate the last time the feeds were updated.

According to various implementations, the system may be configured to validate uploaded feeds. For example, the system may validate that feed items comply with the formatting rules of the system. The system may also determine whether or not a search entity is successfully matched to each feed item in a feed. As shown, feeds 512, 516 may have corresponding statuses 528, 530 that indicates that errors were encountered during the validation. Selection of status 528 may, in some cases, cause screen 502 to navigate to a reporting screen for feed 512. According to various implementations, the system may be configured to allow a content provider to proceed with errors or may prevent the use of a feed until all errors are corrected. For example, a feed having ten thousand items and a single error may still be used for purposes of selecting content based on the 9,999 correct feed items.

Screen 502 may include an input 532 configured to link a selected feed 512, 516 to an existing campaign. The campaign may include auction parameters, such as bidding information, budgetary constrains, timing information (e.g., when bids are to be placed), or other parameters that control when and how bids are placed on behalf of the third-party content provider. For example, other auction parameters may control the types of devices to which the third-party content is presented (e.g., desktop computers, mobile devices, etc.). In another example, some auction parameters may control whether or not a bid is placed based on the geographic location of the client device (e.g., the third-party content is only provided to devices located in the U.S., devices located in a given city or zip code, etc.). By linking a feed to a campaign, a campaign may have any number of entity-action pairs associated with it. Thus, the provider's content may appear across tens of thousands of different search queries or more. For example, a single bid amount defined in the campaign may be used to place bids in auctions whenever a search query relates to one of the streaming movies listed in a feed (e.g., a link to the provider's streaming service may be presented if a user searches for the movie "Sheriff Bob," the movie "Bad Guy Bill," the actor "John Doe," etc.).

Figure 6:
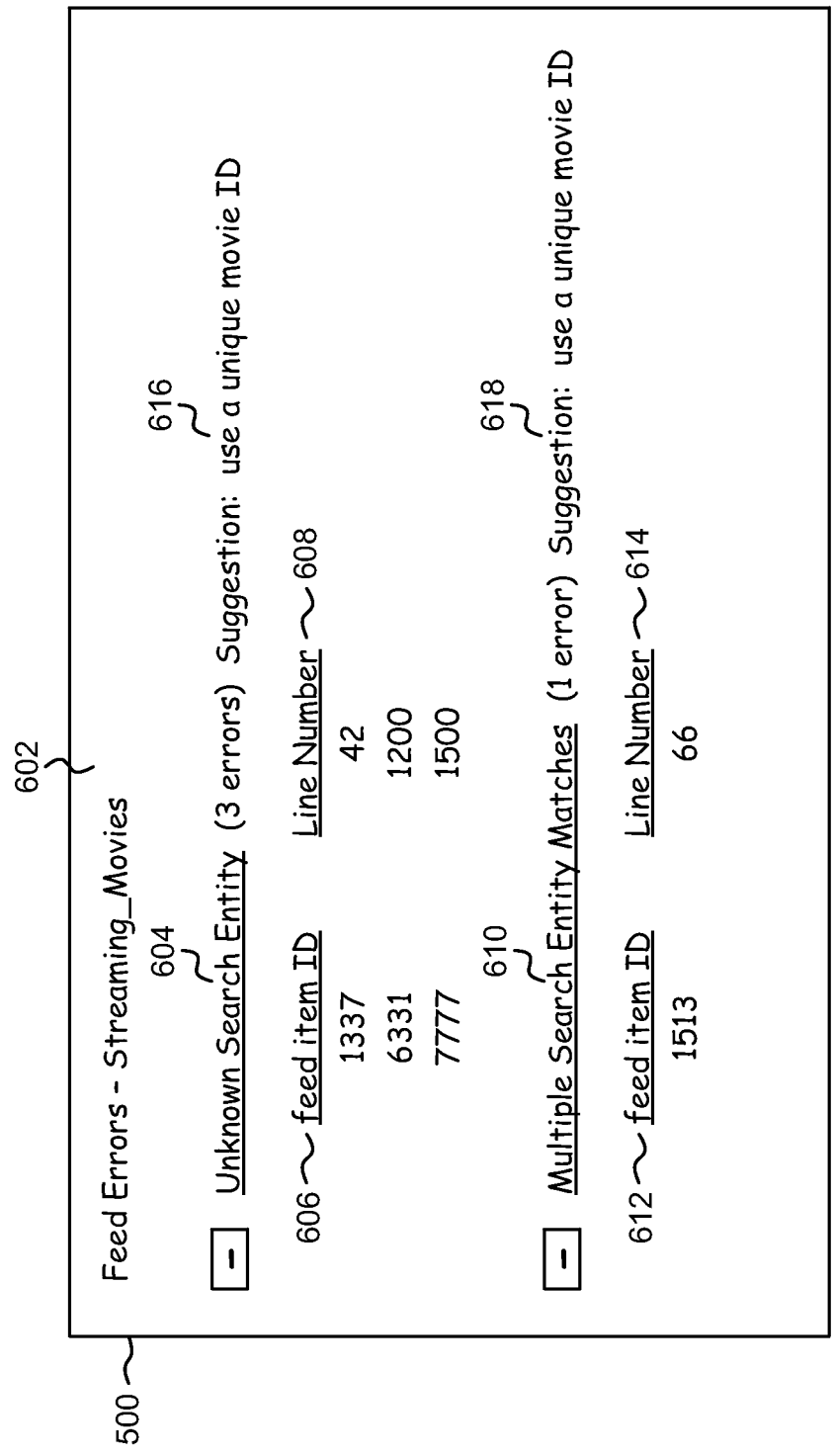
FIG. 6 is an illustration of one implementation of an electronic display showing errors identified in a search entity related feed.

Referring now to FIG. 6, an example illustration is shown of electronic display 500 showing errors identified in a search entity related feed. Continuing the example of FIG. 5, a screen 602 may be provided to display 500 that reports on any errors detected during a feed upload. Screen 602 may be displayed, for example, in response to status 528 shown in FIG. 5 being clicked or otherwise selected. In further implementations, different interface screens may be developed to perform the functions described with regard to screens 502, 602.

Assume that feed 512 shown in FIG. 5 has several thousand feed items, each feed item corresponding to a streaming movie in a third-party provider's catalog. One or more levels of validation may be performed on the feed items to ensure that a successful match between a feed item and an entity-action pair has occurred. As shown, screen 602 may display a first type of error 604 that corresponds to a feed item not matching any search entities. Error 604 may include information such as a feed item identifier 606 and/or a line number 608 in the feed. For example, three entries in the feed may not be matched to a search entity. Potential causes for an unmatched feed item may include, but are not limited to, a corresponding search entity not existing and typographical errors in the feed item (e.g., a misspelled title, an incorrect release year, etc.). In some implementations, screen 602 includes a suggested correction 616 for error 604. For example, the chance of a feed item for a movie matching a search entity may increase if a unique movie identifier is used in the feed item.

Screen 602 may include data regarding another type of error 610 that corresponds to multiple search entities matching a feed item. Similar to error 604, error 610 may include information such as a feed item identifier 612 and/or a line number 614 in the feed. For example, the sixty sixth feed item in the feed may match multiple search entities. Multiple search entities may match a single feed item for a variety of reasons. For example, there may be two e-books that have the same title and were released in the same year. If a feed item only specifies a book title and release year, the feed item may be matched to search entities that correspond to both books. In another example, assume that a particular restaurant has two locations in the same city and that a feed is uploaded to allow users to make reservations at a particular restaurant. If a feed item does not differentiate between the two restaurants, the feed item may match search entities corresponding to both restaurants. Similar to error 604, a suggested correction 618 may be included on screen 602. For example, suggested correction 618 may suggest that the additional information be included in the feed item, to help differentiate between the matching search entities (e.g., including a movie identifier in the feed item for a movie, including a USBN in a feed item for a book, including a location number or address in a feed item for a restaurant or business, etc.).

Other types of errors may also be displayed on screen 602 depending on the level of validation performed on the feed. In some implementations, a feed item or the feed itself may be validated to ensure that it conforms to a predefined format. For example, data fields in a feed item may be required to appear in a particular order in the feed. In another example, data fields in the feed may be required to be delimited using a special character (e.g., a comma, a semicolon, etc.). In yet another example, the type of file used in the feed may be validated to ensure that a supported file type is used. For example, the system may require that the feed be a .xml file before proceeding to analyze the feed. Formatting related errors may be displayed as a whole for the feed (e.g., if the entire feed does not conform to a supported format or file type) or on a per feed item basis (e.g., if a particular feed item is missing a required data field).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of matching a content item in a data file to a search entity comprising:
  maintaining a plurality of entity-action pairs and bidding parameters specific to each entity-action pair of the plurality of entity-action pairs;
  receiving a first search query from a client device, the first search query including a query term indicative of a first search entity;
  identifying, from the plurality of entity-action pairs, a first entity-action pair comprising the first search entity and a first online action and a second entity-action pair comprising the first search entity and a second online action that is different from the first online action responsive to the query term indicative of the first search entity in the received first search query;
  identifying a second search entity not included in the first search query and identified using the first search entity and a knowledge graph of search entities;
  conducting a first content auction for the first entity-action pair based on bidding parameters specific to the first entity-action pair and a second content auction for the second entity-action pair based on bidding parameters specific to the second entity-action pair responsive to identifying the first entity-action pair and the second entity-action pair;
  determining a first set of third-party content items associated with the first entity-action pair for participating in the first content auction, each third-party content item of the first set of third-party content items including executable instructions for causing an application of the client device to automatically perform the first online action upon actuating that third-party content item by the client device;
  determining a second set of third-party content items associated with the first entity-action pair for participating in the second content auction, each third-party content item of the second set of third-party content items including executable instructions for causing the application of the client device to automatically perform the second online action upon actuating that third-party content item by the client device;
  selecting, responsive to the first content auction, a first content item of a first third-party content provider based on a first bidding parameter of the first third-party content provider specific to the first entity-action pair and selecting, responsive to the second content auction, a second content item of a second third-party content provider based on a second bidding parameter of the second third-party content provider-specific to the second entity-action pair, the first and second content items for presenting with search results corresponding to the first search query on the client device; and
  selecting, responsive to identifying the second search entity, a link associated with the second search entity for presenting with the search results corresponding to the first search query on the client device, wherein actuation of the link by the client device causes the first search query to be replaced with a second search query associated with the second search entity and new content items to be selected instead of the first and second content items.

2. The method of claim 1, comprising:
  receiving, at one or more processors, a data file from a computing device of the first third-party content provider comprising one or more content items including the first content item, each of the one or more content items comprising respective identification data, a respective content item type, and a respective online action, each of the one or more content items associated with a respective product or service of the first third-party content provider;
  identifying the first search entity based on identification data and content item type for the first content item in the data file, the first search entity corresponding to a named physical entity;
  generating, based on the data file, the first entity-action pair comprising the first search entity and the first online action, the first online action associated with the first content item of the one or more content items in the data file; and
  associating the first entity-action pair with the first bidding parameter specific to the first entity-action pair.

3. The method of claim 2, comprising:
  generating an error log comprising a content item of the one or more content items for which a plurality of search entities are identified.

4. The method of claim 2, wherein identifying the first search entity comprises:
  searching the knowledge graph of search entities.

5. The method of claim 2, comprising:
  generating an error log comprising a content item of the one or more content items for which no search entities are identified.

6. The method of claim 2, comprising:
  generating a log comprising a content item of the one or more content items successfully matched to a single search entity.

7. A system for matching a content item in a data file to a search entity comprising one or more processors and a memory configured to:
  maintain a plurality of entity-action pairs and bidding parameters specific to each entity-action pair of the plurality of entity-action pairs;
  receive a first search query from a client device, the first search query including a query term indicative of a first search entity;
  identify, from the plurality of entity-action pairs, a first entity-action pair comprising the first search entity and a first online action and a second entity-action pair comprising the first search entity and a second online action that is different from the first online action responsive to the query term indicative of the first search entity in the received first search query;
  identify a second search entity not included in the first search query and identified using the first search entity and a knowledge graph of search entities;
  conduct a first content auction for the first entity-action pair based on bidding parameters specific to the first entity-action pair and a second content auction for the second entity-action pair based on bidding parameters specific to the second entity-action pair and responsive to identifying the first entity-action pair and the second entity-action pair;
  determine a first set of third-party content items associated with the first entity-action pair for participating in the first content auction, each third-party content item of the first set of third-party content items including executable instructions for causing an application of the client device to automatically perform the first online action upon actuating that third-party content item by the client device;

determine a second set of third-party content items associated with the first entity-action pair for participating in the second content auction, each third-party content item of the second set of third-party content items including executable instructions for causing the application of the client device to automatically perform the second online action upon actuating that third-party content item by the client device;

select, responsive to the first content auction, a first content item of a first third-party content provider based on a first bidding parameter of the first third-party content provider specific to the first entity-action pair and select, responsive to the second content auction, a second content item of a second third-party content provider based on a second bidding parameter of the second third-party content provider specific to the second entity-action pair, the first and second content items for presenting with search results corresponding to the first search query on the client device; and select a link associated with the second search entity for presenting with the search results corresponding to the first search query on the client device, wherein actuation of the link by the client device causes the first search query to be replaced with a second search query associated with the second search entity and new content items to be selected instead of the first and second content items.

8. The system of claim 7, wherein the one or more processors and the memory are configured to:

receive a data file from a computing device of a first third-party content provider comprising one or more content items including the first content item, each of the one or more content items comprising identification data, a respective content item type, and a respective online action, each of the one or more content items associated with a product or service of the first third-party content provider;

identify the first search entity based on identification data and a content item type for the first content item in the data file, the first search entity corresponding to a named physical entity;

generate, based on the data file, the first entity-action pair comprising the first search entity and the first online action, the first online action associated with the first content item in the data file; and associate the first entity-action pair with the first bidding parameter specific to the first entity-action pair.

9. The system of claim 8, wherein the one or more processors and the memory are configured to generate an error log comprising a content item of the one or more content items for which no search entities are identified.

10. The system of claim 8, wherein the one or more processors and the memory are configured to generate an error log comprising a content item of the one or more content items for which a plurality of search entities are identified.

11. The system of claim 8, wherein the one or more processors and the memory identify the first search entity by searching the knowledge graph of search entities.

12. The system of claim 8, wherein the one or more processors and the memory are configured to generate a log comprising a content item of the one or more content items that was successfully matched to a single search entity.

13. A non-transitory computer-readable storage medium having machine instructions stored therein, the instructions being executable by one or more processors to cause the one or more processors to perform operations comprising:

maintaining a plurality of entity-action pairs and bidding parameters specific to each entity-action pair of the plurality of entity-action pairs;

receiving a first search query from a client device, the first search query including a query term indicative of a first search entity;

identifying, from the plurality of entity-action pairs, a first entity-action pair comprising the first search entity and a first online action and a second entity-action pair comprising the first search entity and a second online action that is different from the first online action responsive to the query term indicative of the first search entity in the received first search query;

identifying a second search entity not included in the first search query and identified using the first search entity and a knowledge graph of search entities;

conducting a first content auction for the first entity-action pair based on bidding parameters specific to the first entity-action pair and a second content auction for the second entity-action pair based on bidding parameters specific to the second entity-action pair responsive to identifying the first entity-action pair, the second entity-action pair, and the third entity action pair;

determining a first set of third-party content items associated with the first entity-action pair for participating in the first content auction, each third-party content item of the first set of third-party content items including executable instructions for causing an application of the client device to automatically perform the first online action upon actuating that third-party content item by the client device;

determining a second set of third-party content items associated with the first entity-action pair for participating in the second content auction, each third-party content item of the second set of third-party content items including executable instructions for causing the application of the client device to automatically perform the second online action upon actuating that third-party content item by the client device;

selecting, responsive to the first content auction, a first content item of a first third-party content provider based on a first bidding parameter of the first third-party content provider specific to the first entity-action pair and selecting, responsive to the second content auction, a second data item of a second third-party content provider based on a second bidding parameter of the second third-party content provider specific to the second entity-action pair, the first and second content items for presenting with search results corresponding to the first search query on the client device; and selecting, responsive to identifying the second search entity, a link associated with the second search entity for presenting with the search results corresponding to the first search query on the client device, the link when actuated by the client device causes the first search query to be replaced with a second search query associated with the second search entity and new content items to be selected instead of the first and second content items.

14. The non-transitory computer-readable storage medium of claim 13, wherein the instructions being executable by the one or more processors to cause the one or more processors to perform operations comprising:

receiving a data file from a computing device of the first third-party content provider comprising one or more content items including the first content item, each of the one or more content items comprising respective identification data, a respective content item type, and a respective online action, each of the one or more content items associated with a respective product or service of the first third-party content provider;

identifying the first search entity based on identification data and content item type for the first content item in the data file, the first search entity corresponding to a named physical entity;

generating, based on the data file, the first entity-action pair comprising the first search entity and the first online action, the first online action associated with the first content item of the one or more content items in the data file; and associating the first entity-action pair with the first bidding parameter specific to the first entity-action pair.

15. The non-transitory computer-readable storage medium of claim 14, wherein identifying the first search entity comprises searching the knowledge graph of search entities.

* * * * *